United States Patent
Nakamura et al.

(10) Patent No.: US 12,465,341 B2
(45) Date of Patent: Nov. 11, 2025

(54) FASTENING DEVICE, ENDOSCOPE SYSTEM, AND SUTURING METHOD

(71) Applicants: OLYMPUS CORPORATION, Tokyo (JP); National Cancer Center, Tokyo (JP)

(72) Inventors: Takashi Nakamura, Hachioji (JP); Shotaro Takemoto, Hachioji (JP); Satoru Nonaka, Tokyo (JP); Ichiro Oda, Tokyo (JP); Seiichiro Abe, Tokyo (JP)

(73) Assignees: National Cancer Center, Tokyo (JP); OLYMPUS CORPORATION, Tokyo (JP)

( * ) Notice: Subject to any disclaimer, the term of this patent is extended or adjusted under 35 U.S.C. 154(b) by 113 days.

(21) Appl. No.: 18/594,616

(22) Filed: Mar. 4, 2024

(65) Prior Publication Data
US 2024/0197302 A1 Jun. 20, 2024

Related U.S. Application Data

(63) Continuation of application No. PCT/JP2021/033265, filed on Sep. 10, 2021.

(51) Int. Cl.
*A61B 17/00* (2006.01)
*A61B 1/00* (2006.01)
*A61B 17/04* (2006.01)
*A61B 17/064* (2006.01)

(52) U.S. Cl.
CPC .... *A61B 17/00234* (2013.01); *A61B 1/00101* (2013.01); *A61B 17/0469* (2013.01); *A61B 17/0644* (2013.01); *A61B 2017/00296* (2013.01)

(58) Field of Classification Search
CPC . A61B 17/068; A61B 1/0014; A61B 17/0469; A61B 1/00087; A61B 17/00234; A61B 2017/00296; A61B 17/0644; A61B 1/00101
See application file for complete search history.

(56) References Cited

U.S. PATENT DOCUMENTS

2018/0042603 A1 2/2018 Mitelberg et al.
2021/0022720 A1 1/2021 Smith et al.

OTHER PUBLICATIONS

"International Application Serial No. PCT/JP2021/033265, International Search Report dated Nov. 16, 2021", w/ English Translation, (Nov. 16, 2021), 4 pgs.

*Primary Examiner* — Richard G Louis
(74) *Attorney, Agent, or Firm* — Schwegman Lundberg & Woessner, P.A.

(57) ABSTRACT

A fastening device includes a shaft having a longitudinal axis, a fixing member configured to fix the shaft to an endoscope by being attached to the endoscope, a staple unit attached to a distal end of the shaft and rotatable around the longitudinal axis, an operation unit provided at a proximal-end portion of the shaft, and a rotation restriction mechanism configured to restrict rotation of the staple unit around the longitudinal axis with respect to the endoscope due to an operation of the operation unit.

18 Claims, 17 Drawing Sheets

FASTENING DEVICE, ENDOSCOPE SYSTEM, AND SUTURING METHOD

This application is a continuation application of PCT International Application No. PCT/JP2021/033265, filed on Sep. 10, 2021. The content of the above-identified PCT International Applications is incorporated herein by reference.

TECHNICAL FIELD

The present disclosure relates to a fastening device, an endoscope system, and a suturing method.

BACKGROUND ART

In recent years, in a surgery to suture the gastrointestinal tract or the like, a fastening device such as a medical stapler (hereinafter, may be referred to as a stapler) and an endoscope system including such a fastening device have been used to suture a tissue. When an appropriate stapler is used, a surgery to suture the gastrointestinal tract or the like can be easily performed and a surgical time can be significantly reduced.

In an endoscopic suturing system disclosed in United States Patent Application, Publication No. 2018/0042603, a tissue retractor is advanceable with respect to a suturing device, and the suturing target tissues are retracted to the suturing device to be sutured by the advanced tissue retractor.

In a surgery to perform a treatment on a tissue inside the body using an endoscope system including a fastening device, a relative positional relationship between the fastening device and the endoscope may be adjusted. For example, when the fastening device is inserted to the position close to a tissue inside the body to be treated to perform a treatment by inserting the endoscope into the body, a direction of a stapler may be adjusted to be aligned with a direction in which the tissue is sutured. For example, in the process of treating the tissue, the tissue grasped by the fastening device may be observed from the fastening device side. In such a case, it is necessary to adjust a relative positional relationship between the endoscope and the fastening device attached to a distal end side of the endoscope. More specifically, the fastening device may be rotated with respect to the endoscope in a circumferential direction around a longitudinal axis of the endoscope.

On the other hand, in the process of inserting the endoscope into the body, it is necessary to prevent the fastening device attached to a distal end side of the endoscope from unintentionally coming into contact with tissues inside the body, prevent the fastening device from blocking a field of view of the endoscope, or the like.

In view of the above circumstances, an objective of the present disclosure is to provide a fastening device in which a relative positional relationship in a circumferential direction between an endoscope and a fastening device attached to a distal end side of the endoscope can be suitably adjusted in the process of performing a treatment on a tissue inside the body, an endoscope system including such a fastening device, and a suturing method of a tissue inside the body using the endoscope system.

SUMMARY

According to one aspect of the present disclosure, a fastening device includes a shaft having a longitudinal axis, a fixing member configured to fix the shaft to an endoscope by being attached to the endoscope, a staple unit attached to a distal end of the shaft and rotatable around the longitudinal axis, an operation unit provided at a proximal-end portion of the shaft, and a rotation restriction mechanism configured to restrict rotation of the staple unit around the longitudinal axis with respect to the endoscope due to an operation of the operation unit.

According to another aspect of the present disclosure, an endoscope system includes an endoscope, a shaft having a longitudinal axis along the endoscope, a staple unit attached to a distal end of the shaft and rotatable around the longitudinal axis, an operation unit provided at a proximal-end portion of the shaft, and a rotation restriction mechanism configured to restrict rotation of the staple unit around the longitudinal axis with respect to the endoscope due to an operation of the operation unit.

According to a yet another aspect of the present disclosure, a suturing method of a tissue using a fastening device including a shaft having a longitudinal axis, a fixing member configured to fix the shaft to an endoscope by being attached to the endoscope, a staple unit attached to a distal end of the shaft and rotatable around the longitudinal axis, an operation unit provided at a proximal-end portion of the shaft, and a rotation restriction mechanism configured to restrict rotation of the staple unit around the longitudinal axis with respect to the endoscope due to an operation of the operation unit, includes a step of inserting the staple unit and the endoscope, which are in a state in which the rotation thereof around the longitudinal axis is restricted, into a body, a step of grasping at least a part of the tissue with forceps, a step of pulling a part of the tissue relatively to a proximal end side of the endoscope and positioning a part of the tissue grasped by the forceps within a sutureable range of the fastening device, a step of releasing a state in which the rotation of the staple unit around the longitudinal axis is restricted, and a step of ejecting a staple and suturing the tissue using the staple unit.

Advantageous Effects of Invention

According to the fastening device, the endoscope system, and the suturing method according to the above-described aspects of the present disclosure, a state in which the fastening device attached to a distal end side of the endoscope is rotatable around a longitudinal axis direction and a state in which rotation of the fastening device around the longitudinal axis is restricted can be suitably switched between in the process of performing a treatment on a tissue inside the body.

DESCRIPTION OF EMBODIMENTS

First Embodiment

Figure 1:
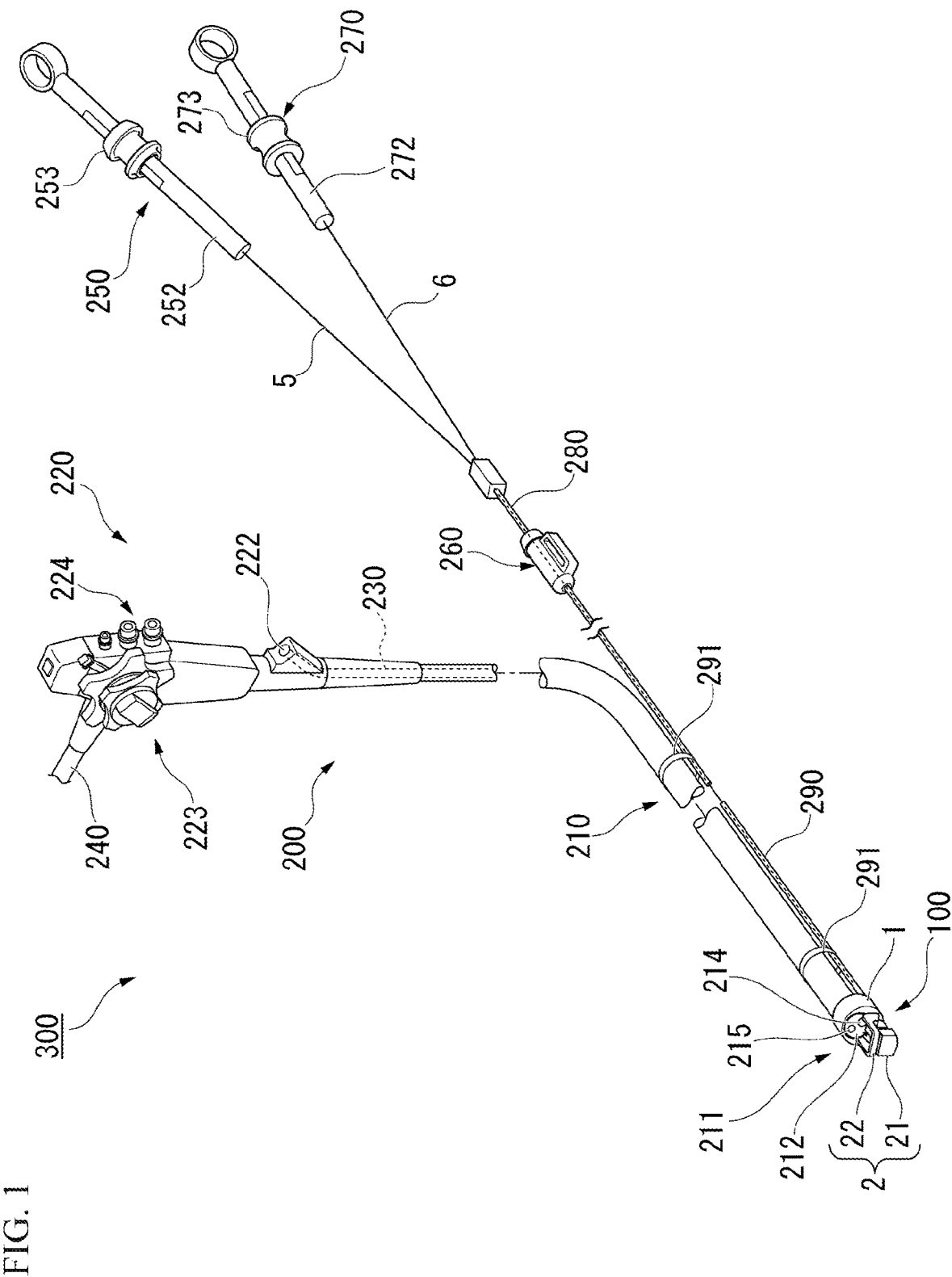
FIG. 1 is a view showing an overall configuration of an endoscope system including a fastening device according to a first embodiment of the present disclosure.

Hereinafter, a first embodiment of the present disclosure will be described with reference to FIGS. 1 to 8. FIG. 1 is a view showing an overall configuration of an endoscope system 300 including a fastening device 100 according to the present embodiment.

The endoscope system 300 according to the present embodiment is used for surgery or the like in which the gastrointestinal tract or the like is sutured. The endoscope system 300 includes the fastening device 100 (medical stapler, staple unit), an endoscope 200, an open-close operation unit 250, a needle ejection operation unit 270, a wire sheath (shaft) 280, a resin sheath 290, and a wire sheath fixing portion 260. The open-close operation unit 250 is an operation unit that operates the fastening device 100 using an open-close operation wire 5. The open-close operation wire 5 is constituted by a wire and a coil sheath provided to cover the wire. The needle ejection operation unit 270 is an operation unit that operates the fastening device 100 using a needle ejection wire 6. Similarly to the open-close operation wire 5, the needle ejection wire 6 is also constituted by a wire and a coil sheath provided to cover the wire. In the present embodiment, the fastening device 100 is configured as, for example, a medical stapler.

The endoscope 200 has a configuration of a known flexible endoscope. The endoscope 200 includes a long insertion portion 210 that is inserted into a body from a distal end thereof, an operation unit 220 provided at a proximal-end portion of the insertion portion 210, and a universal cord 240.

A treatment tool channel 230 through which an endoscopic treatment tool is inserted is formed in the insertion portion 210. A forceps port 214, which is a distal end opening of the treatment tool channel 230, is provided at a distal-end portion 212 of the insertion portion 210. The treatment tool channel 230 extends from the distal-end portion 212 of the insertion portion 210 to the operation unit 220.

A distal-end portion 211 of the insertion portion 210 includes an imaging unit (not shown) including a CCD or the like. An objective lens 215 of the imaging unit is exposed at the distal-end portion 212 of the insertion portion 210. The distal-end portion 211 of the insertion portion 210 has a rigid portion on a distal end side.

A knob 223 for operating the insertion portion 210 and a switch 224 for operating the imaging unit and the like are provided on a proximal end side of the operation unit 220. An operator can bend the insertion portion 210 in a desired direction by operating the knob 223.

A forceps insertion port 222 communicating with the treatment tool channel 230 is provided on a distal end side of the operation unit 220. The operator can insert the endoscopic treatment tool into the treatment tool channel 230 through the forceps insertion port 222.

The universal cord 240 connects the operation unit 220 and an external peripheral device. The universal code 240 outputs, for example, an image captured by the imaging unit to an external device. The image captured by the imaging unit is displayed on a display device such as a liquid crystal display via an image processing device.

The open-close operation unit 250 is configured to open and close the fastening device 100 by operating the open-close operation wire 5. As shown in FIG. 1, the open-close operation unit 250 includes an open-close operation unit main body 252 and an open-close operation slider 253. A proximal end of the open-close operation wire 5 is coupled to the open-close operation slider 253. The operator can advance and retract the open-close operation wire 5 by advancing and retracting the open-close operation slider 253 in a longitudinal axis direction with respect to the open-close operation unit main body 252.

The needle ejection operation unit 270 is configured to eject a staple S (see FIG. 25) from the fastening device 100 and suture a tissue inside the body to be treated by operating the needle ejection wire 6. As shown in FIG. 1, the needle ejection operation unit 270 includes a needle ejection operation unit main body 272 and an ejection operation slider 273. A proximal end of the needle ejection wire 6 is coupled to the ejection operation slider 273. The operator can advance and retract the needle ejection wire 6 by advancing and retracting the ejection operation slider 273 in the longitudinal axis direction with respect to the needle ejection operation unit main body 272.

Figure 8:
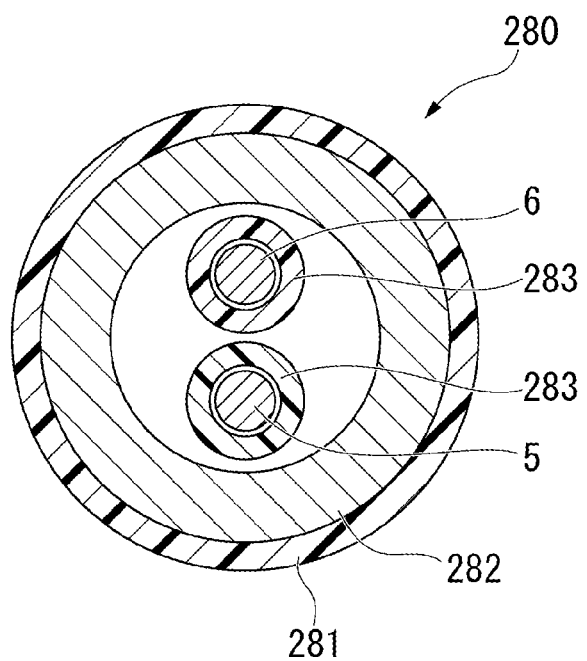
FIG. 8 is a cross-sectional view along line A-A in FIG. 7.

The wire sheath 280 is a sheath through which the open-close operation wire 5 and the needle ejection wire 6 are inserted. As shown in FIG. 8, the wire sheath 280 is formed to include a cover layer 281 formed on an outer circumference and a coil sheath 282 formed on an inner side of the cover layer 281. The cover layer 281 is formed of, for example, a tube containing a blade, a three-layer coil, or the like, and can be rotated following a rotation operation by the operator. The coil sheath 282 has flexibility, and in which an inner lumen through which two inner sheaths 283 to be described later can be inserted is formed. In the present embodiment, an example in which the cover layer 281 is formed on an outer side of the coil sheath 282 in a radial direction of the wire sheath 280 will be described, but the present embodiment is not limited to this configuration. For example, the cover layer 281 may be formed on an inner side of the coil sheath 282 in the radial direction of the wire sheath 280.

The two inner sheaths 283 are inserted through the inner lumen formed in the wire sheath 280. The two inner sheaths 283 are formed of a resin material and have flexibility. The open-close operation wire 5 and the needle ejection wire 6 are inserted into the two inner sheaths 283, respectively. The wire sheath 280 may have a multi-lumen tube having two lumens instead of the two inner sheaths 283.

As shown in FIG. 1, the resin sheath 290 is a sheath through which the wire sheath 280 is insertable to be advanceable and retractable therein. The resin sheath 290 is formed of resin material. As shown in FIG. 1, a distal end side of the resin sheath 290 is coupled to the insertion portion 210 of the endoscope 200 by a band 291. In the resin sheath 290, a distal end thereof is fixed to a cap 1 of the fastening device 100 and a proximal end thereof is fixed to the wire sheath fixing portion 260.

Figure 2:
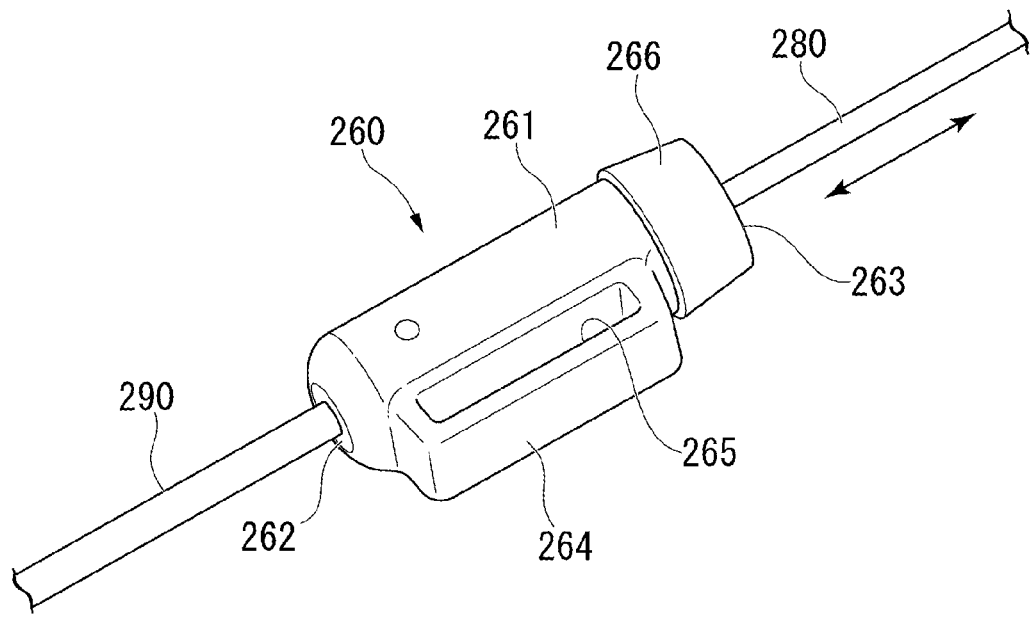
FIG. 2 is a perspective view showing a configuration of a wire sheath fixing portion of the endoscope system.

FIG. 2 is a perspective view of the wire sheath fixing portion 260. The wire sheath fixing portion 260 is a fixing portion that restricts unintended advance and retraction or unintended rotation of the wire sheath 280 with respect to the resin sheath 290. The wire sheath fixing portion 260 includes a wire sheath fixing portion main body 261 and a band attachment portion 264.

The wire sheath fixing portion main body 261 is formed in a cylindrical shape and includes a distal end opening 262 and a proximal end opening 263. A proximal end of the resin sheath 290 is fixed to the distal end opening 262. From the proximal end opening 263, the wire sheath 280 is formed to extend to the proximal end side.

The band attachment portion 264 is a member attached to the operation unit main body 261 and has a band insertion hole 265. When a band (not shown) that has been passed through the band insertion hole 265 is attached to the endoscope 200, the operation unit main body 261 can be easily fixed to the endoscope 200. When the operation unit main body 261 is fixed to the endoscope 200, the wire sheath 280 and the resin sheath 290 can be prevented from separating from the insertion portion 210 of the endoscope 200.

A rubber stopper 266 that is in contact with the wire sheath 280 is provided in the proximal end opening 263 of the wire sheath 280. A frictional force generated between the wire sheath 280 and the rubber stopper 266 can suppress an unintended advance and retraction operation and rotational operation of the wire sheath 280 during a treatment.

Figure 3:
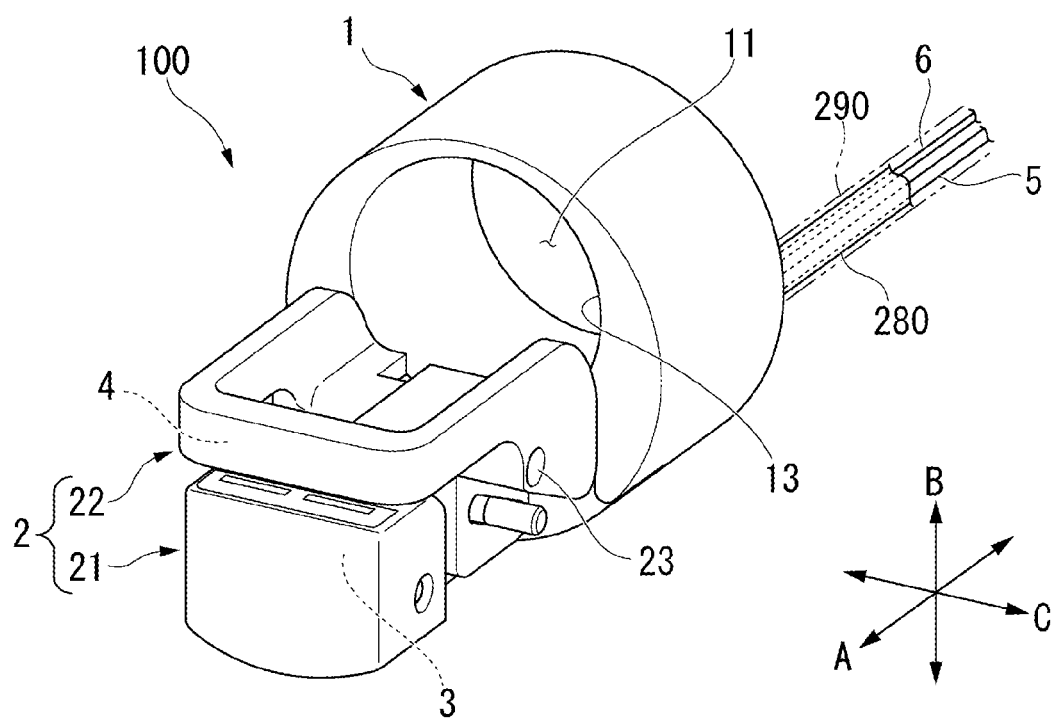
FIG. 3 is a perspective view showing a configuration of a distal-end portion of the fastening device of the endoscope system.

FIG. 3 is a perspective view of the fastening device 100 according to the present embodiment. The fastening device 100 includes the cap (fixing member) 1, a grasping portion (staple unit) 2, a staple ejection portion 3, a staple receiving portion 4, the open-close operation wire 5, and the ejection operation wire 6. The grasping portion 2 includes a first grasping member (first jaw, staple head) 21, a second grasping member (second jaw, anvil) 22, an open-close rotation shaft 23, and a movable pin (not shown). The first grasping member 21 and the second grasping member 22 are coupled to be openable and closable by the open-close rotation shaft 23. The first grasping member 21 and the second grasping member 22 rotate relatively to grasp a target tissue. The open-close rotation shaft 23 is provided on a distal end side with respect to the cap 1. An axial direction C of the open-close rotation shaft 23 is perpendicular to an axial direction A of the cap 1 and a vertical direction B. The fastening device 100 is attachable to and detachable from the distal-end portion 211 of the insertion portion 210 of the endoscope 200.

The cap 1 is formed in a substantially columnar shape. The cap 1 has a first through hole 11 penetrating in the axial direction A and a second through hole 12 (see FIG. 6) penetrating in the axial direction A. The first through hole 11 is a hole into which the distal-end portion 211 of the insertion portion 210 is inserted. A shape of the first through hole 11 is formed to follow an outer shape of the distal-end portion 211 of the insertion portion 210. Therefore, when the distal-end portion 211 of the endoscope 200 is inserted into the first through hole 11, the cap 1 can be attached to the distal-end portion 211 of the endoscope 200. In the present embodiment, a central axis of the first through hole 11 in the axial direction A is eccentric with respect to a central axis of the cap 1 in the axial direction A.

The second through hole 12 (see FIG. 6) is a hole into which the resin sheath 290 is inserted. An inner diameter of the second through hole 12 substantially coincides with an outer diameter of the resin sheath 290. A distal-end portion of the resin sheath 290 is inserted through the second through hole 12 and fixed. The wire sheath 280, the open-close operation wire 5, and the ejection operation wire 6, which are inserted through the resin sheath 290, are inserted through the second through hole 12 and extend to the distal end side.

A central axis of the second through hole 12 in the axial direction A is eccentric with respect to the central axis of the cap 1 in the axial direction A. A direction in which the central axis of the second through hole 12 is eccentric with respect to the central axis of the cap 1 is opposite to a direction in which the central axis of the first through hole 11 is eccentric with respect to the central axis of the cap 1. In other words, in the present embodiment, the central axis of the first through hole 11 and the central axis of the second through hole 12 are disposed on both sides of the central axis of the cap 1 in the vertical direction B.

Figure 4:
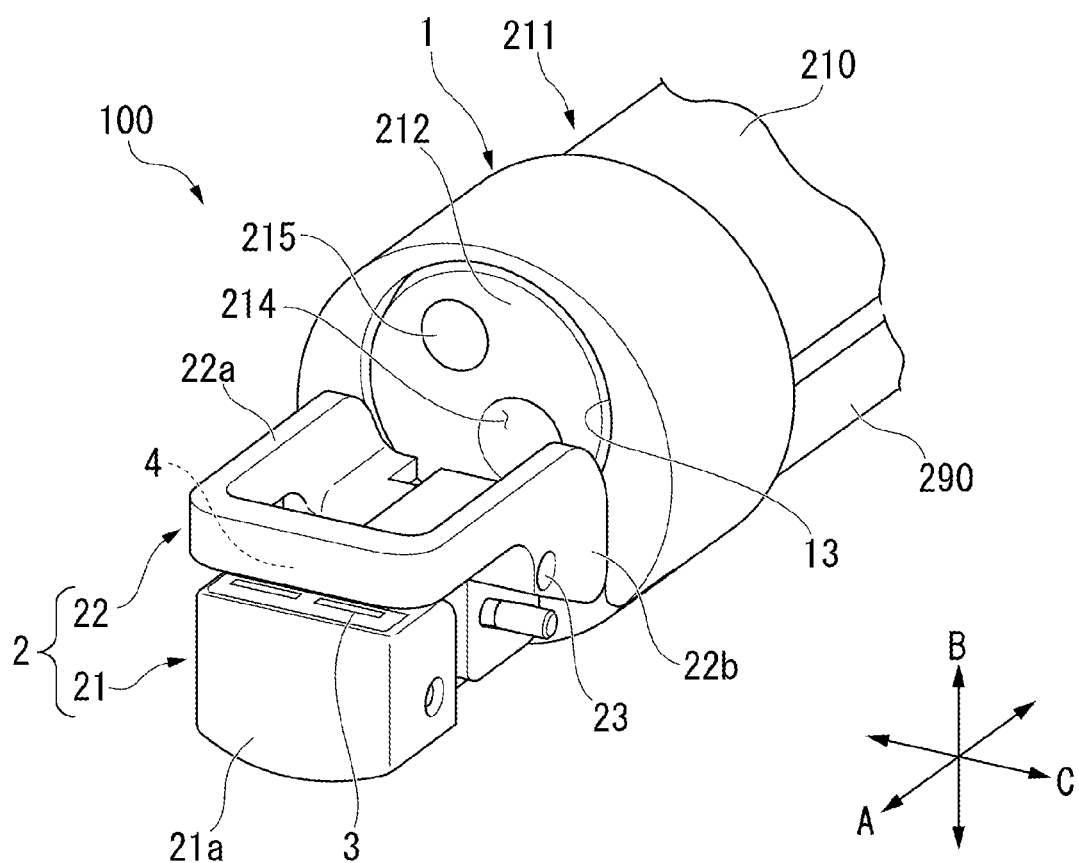
FIG. 4 is a perspective view showing a closed state of a grasping portion with the fastening device attached to the endoscope.
Figure 5:
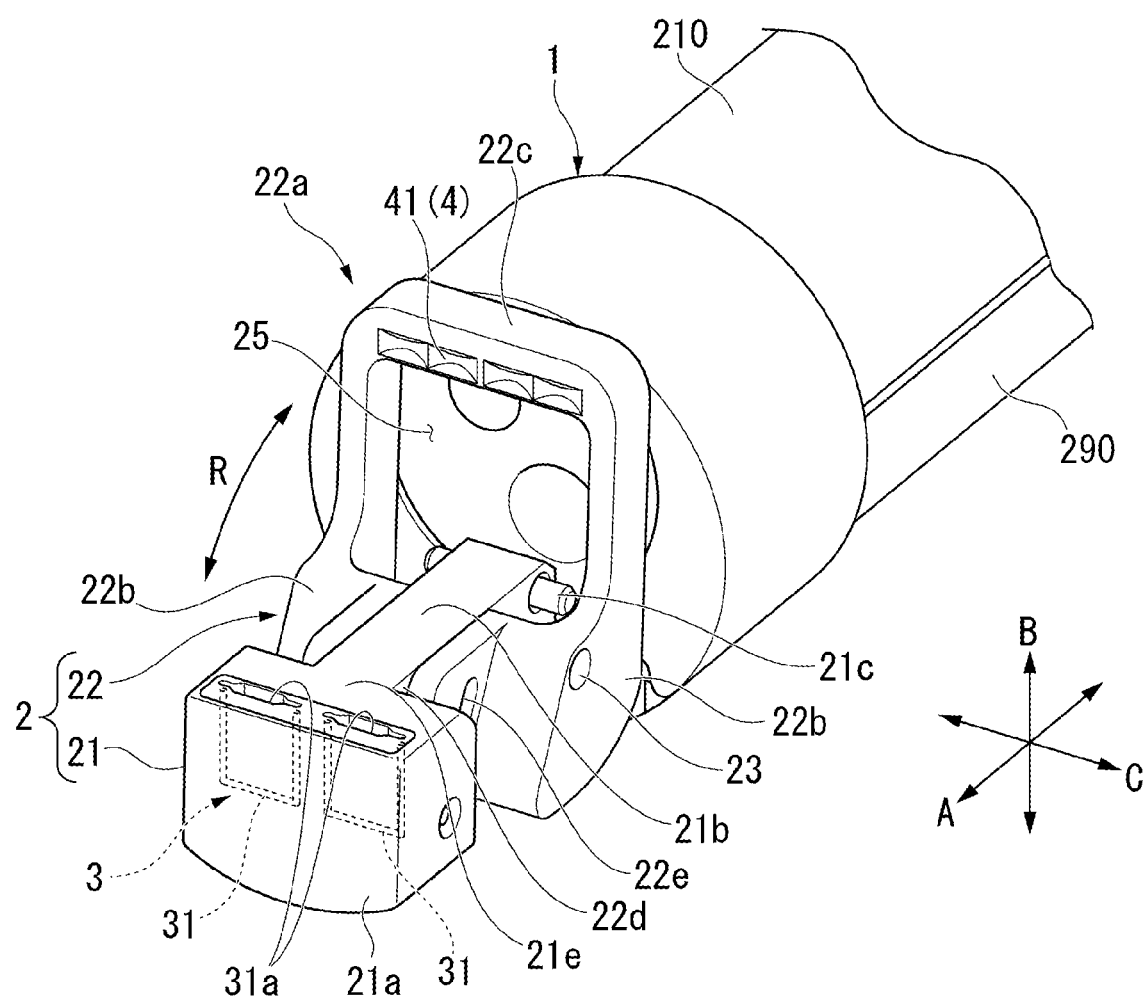
FIG. 5 is a perspective view showing an open state of the grasping portion with the fastening device attached to the endoscope.

FIG. 4 is a perspective view showing a state in which the fastening device 100 according to the present embodiment is attached to the distal-end portion of the insertion portion 210 of the endoscope 200. The first grasping member 21 includes a first distal-end portion 21a and a proximal-end portion 21b, and is formed in substantially a T shape in a plan view. The first distal-end portion 21a is disposed on a distal end side with respect to the proximal-end portion 21b. The first distal-end portion 21a is formed in a substantially rectangular parallelepiped shape. The first distal-end portion 21a is formed in a rectangular shape extending in the axial direction C of the open-close rotation shaft 23 in a plan view. The staple ejection portion 3 is provided at the first distal-end portion 21a. An opening of the staple ejection portion 3 is provided on an upper surface of the first distal-end portion 21a. The proximal-end portion 21b is formed to be accommodated in a recessed portion 1a of the cap 1 to be described later. As shown in FIG. 5, the first grasping member 21 further includes a contact pin 21c and a first engagement groove 21d. The contact pin 21c is provided at a proximal end of the first main body portion 21b, and comes into contact with the second grasping member 22 that is in a closed state to restrict a movable range of the second grasping member 22. The first engagement groove 21d is a groove in the first grasping member 21 penetrating in the axial direction C of the open-close rotation shaft 23. The first engagement groove 21d extends in the axial direction A.

Figure 6:
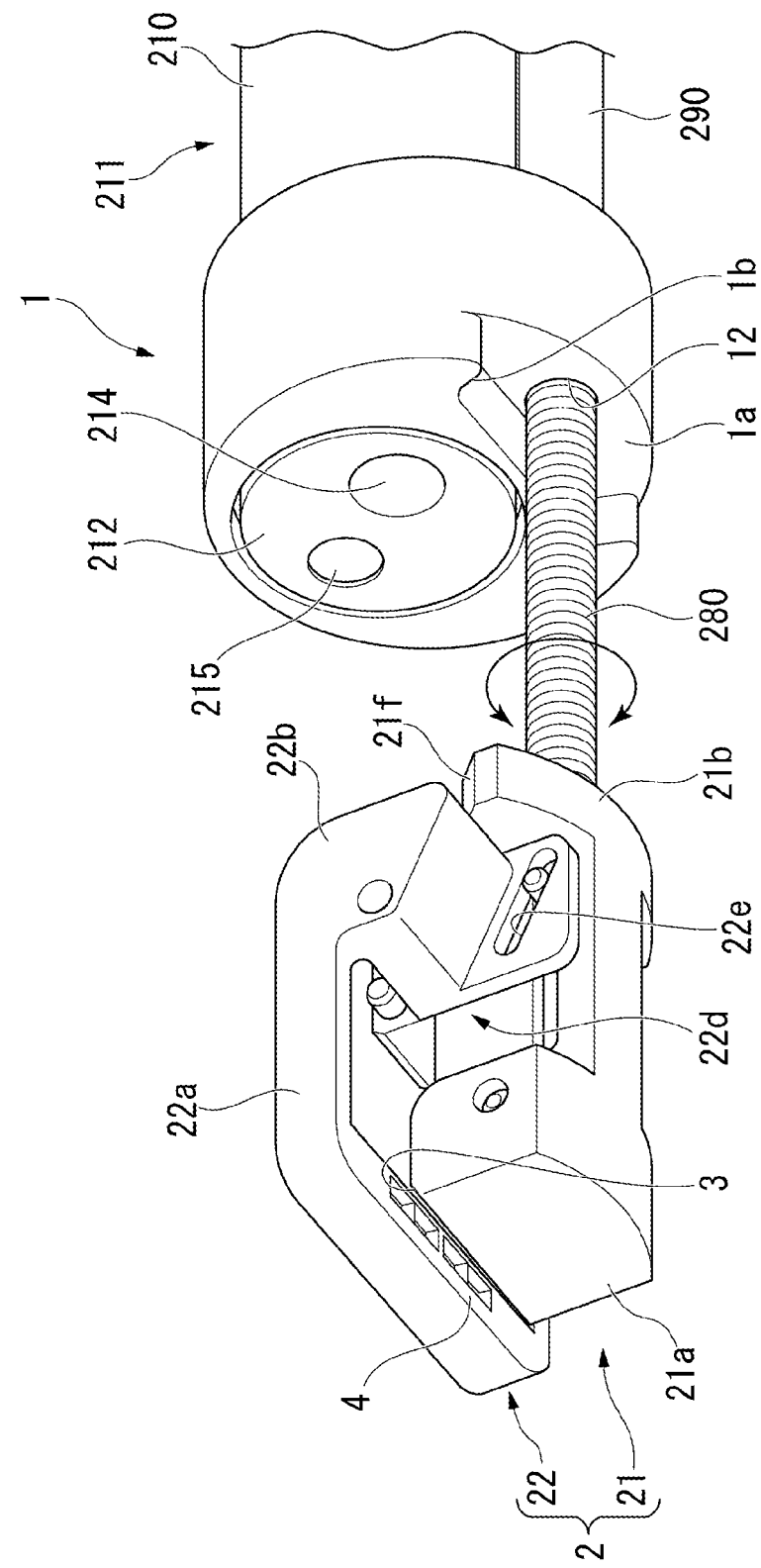
FIG. 6 is a view showing an operation of releasing a rotation restriction on the fastening device.

The second grasping member 22 includes a U-shaped member 22a formed in substantially a U shape, and a second main body portion 22b supporting the U-shaped member 22a to be rotatable. The U-shaped member 22a is formed in substantially a U shape, and both end parts thereof are coupled to the second main body portion 22b, and a center part thereof is disposed on a distal end side. A distal end side of the center part of the U-shaped member 22a is formed in a substantially rectangular parallelepiped shape, and the staple receiving portion 4 is provided thereon. The second main body portion 22b is rotatably attached to the first main body portion 21b of the first grasping member 21 by the open-close rotation shaft 23. A guide groove 22d (see FIG. 6) into which the first main body portion 21b is inserted is formed in the second main body portion 22b. As shown in FIGS. 5 and 6, a second engagement groove 22e is formed on both side portions of the guide groove 22d of the second main body portion 22b.

When the fastening device 100 is inserted into the body while being attached to the distal-end portion of the insertion portion 210 of the endoscope 200, the fastening device 100 is in contact with the cap 1 with the first grasping member 21 and the second grasping member 22 closed in the grasping portion 2. More specifically, as shown in FIG. 4, the proximal-end portion 21b of the first grasping member 21 is fitted into the recessed portion 1a (see FIG. 6) formed on a distal end side of the cap 1.

When the cap 1 is attached to the distal-end portion 211 of the endoscope 200, as shown in FIGS. 4 and 5, the objective lens 215 and the forceps port 214 are exposed from an opening 13 on a distal end side of the first through hole 11 of the cap 1. The operator can observe the treatment target through the objective lens 215 even when the fastening device 100 is attached to the distal-end portion 211 of the endoscope 200.

As shown in FIG. 4, when the grasping portion 2 is in a closed state, the staple ejection portion 3 and the staple receiving portion 4 face each other. When the grasping portion 2 is in the closed state, a slight gap is formed between the staple ejection portion 3 and the staple receiving portion 4. When the grasping portion 2 is in the closed state, an optical axis of the objective lens 215 passes outside the first grasping member 21 and the second grasping member 22. When the grasping portion 2 is in the closed state, a central axis of the forceps port 214 is at a position not overlapping the first grasping member 21, but overlapping the second grasping member 22.

As shown in FIG. 5, when the grasping portion 2 is in an open state, the staple receiving portion 4 is disposed on a proximal end side with respect to the open-close rotation shaft 23. When the grasping portion 2 is in the open state, the staple ejection portion 3 and the staple receiving portion 4 are disposed on both sides with the optical axis of the objective lens 215 interposed therebetween. When the grasping portion 2 is in the open state, the optical axis of the objective lens 215 passes through a visual space 25. When the grasping portion 2 is in the open state, the central axis of the forceps port 214 passes through the visual space 25.

FIG. 6 is a view showing a state (first state) in which an engagement between the grasping portion 2 and the cap 1 is released. As shown in FIG. 6, the recessed portion 1a having a dimension that allows at least a part of the proximal-end portion 21b of the first grasping member 21 to be fitted therein is formed at a distal-end portion of the cap 1. The proximal-end portion 21b of the first grasping member 21 is formed in a shape corresponding to a shape of the recessed portion 1a of the cap 1. Therefore, when the grasping portion 2 and the cap 1 are engaged with each other with at least a part of the proximal-end portion 21b of the first grasping member 21 accommodated in the recessed portion 1a, rotation of the grasping portion 2 with respect to the cap 1 is restricted (second state). In the present embodiment, the proximal-end portion 21b of the first grasping member 21 and the recessed portion 1a of the cap 1 constitute a rotation restriction mechanism of the fastening device 100.

Figure 7:
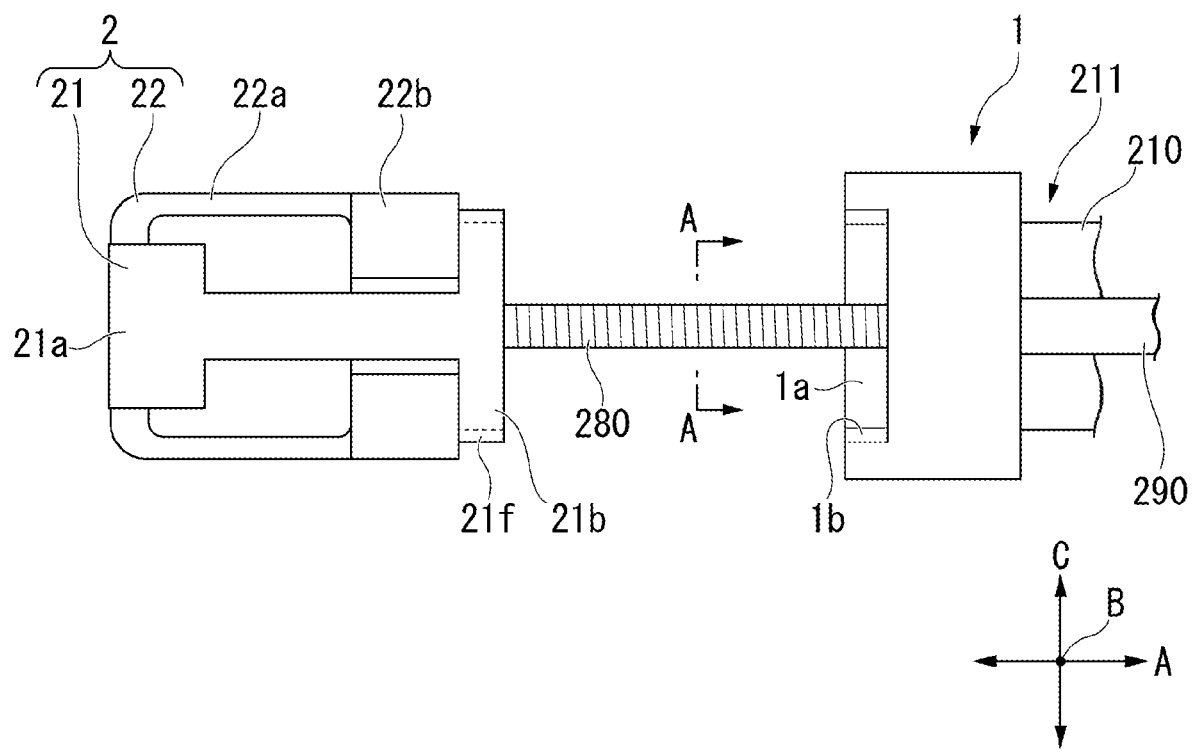
FIG. 7 is a bottom view showing an operation of releasing the rotation restriction on the fastening device.

FIG. 7 is a bottom view showing a state in which the wire sheath 280 is disengaged from the cap 1. As shown in FIGS. 6 and 7, an inclined surface 1b is formed in a circumferential direction of the recessed portion 1a of the cap 1. An inclined surface 21f corresponding to the inclined surface 1b is formed in a circumferential direction of the proximal-end portion 21b of the first grasping member 21. As described above, the grasping portion 2 and the cap 1 can be engaged in a state in which the inclined surface 21f of the first grasping member 21 and the inclined surface 1b of the cap 1 are in contact with each other. Therefore, as shown in FIG. 4, in a state in which the grasping portion 2 and the cap 1 are engaged, even if the operator attempts to rotate the wire sheath 280 by operating the wire sheath fixing portion 260, the rotation of the grasping portion 2 coupled to the wire sheath 280 with respect to the longitudinal axis is restricted.

As shown in FIGS. 6 and 7, when the operator operates the wire sheath fixing portion 260 to cause the wire sheath 280 to protrude to the distal end side with respect to the cap 1, the grasping portion 2 coupled to the wire sheath 280 is also moved to the distal end side. Through such an operation, the engagement between the grasping portion 2 and the cap 1 is released. In other words, when the operator operates the wire sheath fixing portion 260 to cause the wire sheath 280 to protrude to the distal end side with respect to the cap 1, a state in which rotation around the longitudinal axis of the grasping portion 2 is restricted can be released. At this time, the grasping portion 2 enters a rotatable state (first state) around the longitudinal axis.

In this state, the operator can rotate the grasping portion 2 around the longitudinal axis by operating the wire sheath 280 to rotate. Through such an operation, for example, a direction of the grasping portion 2 can be adjusted to be aligned with the tissue. Thereafter, the operator can perform a treatment on the tissue of the treatment target using the same operation as that in a conventional fastening device. In the process of the treatment, when the operator rotates the wire sheath 280, the operator can observe the tissue of the treatment target grasped by the grasping portion 2 at a desired angle using the imaging unit of the endoscope 200. For example, when the operator rotates the wire sheath 280, the tissue can be observed from the first grasping member 21 side.

When the fastening device 100 is removed from the inside of the body after the treatment on the tissue to be treated using the fastening device 100 is completed, in order to facilitate the removal operation and avoid unintended contact with the tissue inside the body, it is preferable to re-engage the grasping portion 2 and the cap 1 to remove them as an integrated structure. Therefore, the operator operates to rotate the wire sheath 280 to align the proximal-end portion 21b of the first grasping member 21 with the recessed portion 1a of the cap 1, and then retracts the wire sheath 280 to the proximal end side. More specifically, for example, when the operator rotates the wire sheath 280 while observing a posture of the grasping portion 2 with the imaging unit of the endoscope 200, the inclined surface 21f of the proximal-end portion 21b of the first grasping member 21 can be aligned with the inclined surface 1b formed in the recessed portion 1a of the cap 1. In this state, when the operator retracts the wire sheath 280 to the proximal end side, the grasping portion 2 and the cap 1 are engaged with each other with the proximal-end portion 21b of the first grasping member 21 accommodated in the recessed portion 1a of the cap 1. Thereafter, the operator can remove the grasping portion 2 and the cap 1, which have been engaged and integrated, from the inside of the body.

According to the fastening device 100 according to the present embodiment, a state of the engagement between the cap 1 and the grasping portion 2 can be switched as appropriate. In a state in which the cap 1 and the grasping portion 2 are engaged, the rotation of the grasping portion 2 around the longitudinal axis is restricted even if the operator rotates the wire sheath 280. In other words, in this state, the rotation of the grasping portion 2 around the axis with respect to the endoscope 200 is restricted. When the fastening device 100 according to the present embodiment is attached to the endoscope 200 and inserted into the body, it is possible to avoid obstructing a field of view of the imaging unit of the endoscope 200, unintentionally contacting the tissue inside the body, or the like.

When the operator moves the wire sheath 280 to the distal end side to cause the grasping portion 2 to protrude further to the distal end side than the cap 1, the engagement between the cap 1 and the grasping portion 2 is released. In this state, the operator can rotate the wire sheath 280 and the grasping portion 2 coupled to the wire sheath 280 around the longitudinal axis. When the fastening device 100 according to the present embodiment is inserted into the body and a treatment on the tissue is performed, aligning a direction of the grasping portion 2 with a direction in which the tissue is sutured, observing the tissue from a desired direction, or the like is possible.

As described above, according to the fastening device 100 and the endoscope system 300 including the fastening device 100 according to the present embodiment, the operator can appropriately switch the fastening device 100 between the rotatable state and the rotation restriction state with respect to the endoscope 200 only by operating the wire sheath 280.

Figure 9:
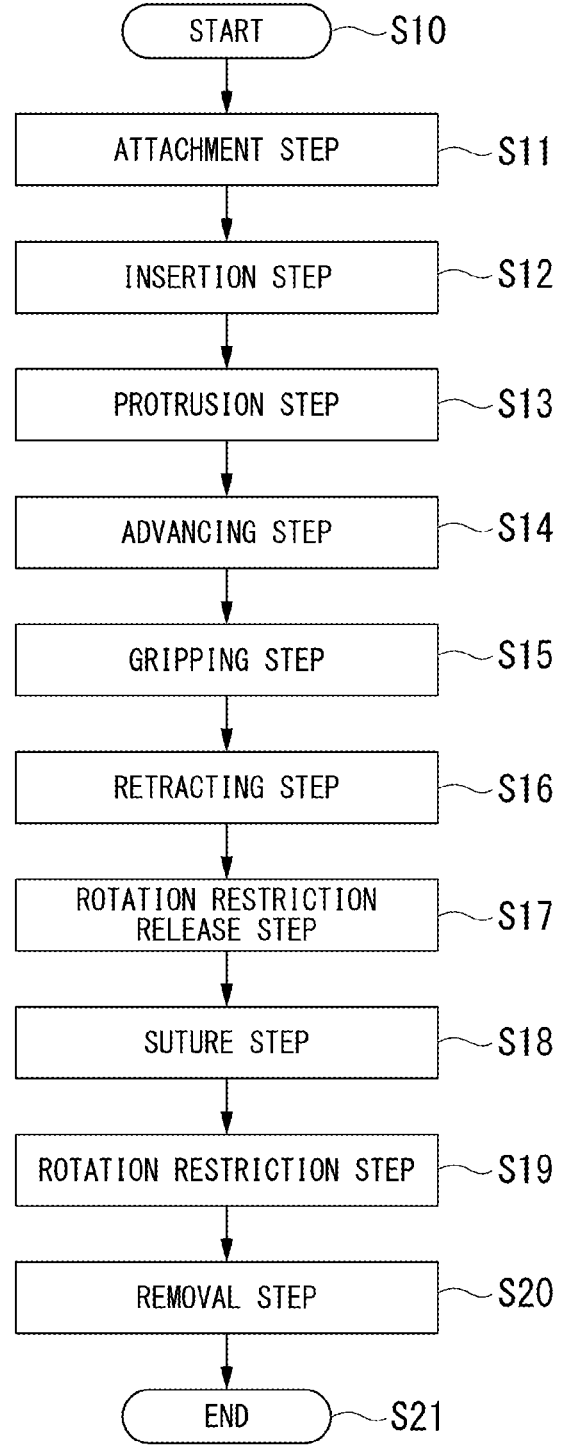
FIG. 9 is a flowchart showing a flow of a suturing method of a tissue inside the body using the fastening device according to the present embodiment.

Next, an operation of the fastening device 100 according to the present embodiment described above will be described with reference to FIGS. 9 to 14 as an example. FIG. 9 is a flowchart showing surgery procedures using the fastening device 100 performed by the operator. FIGS. 10 to 14 are views showing an operation of the fastening device 100.

As shown in FIG. 9, the operator attaches the fastening device 100 to the distal-end portion 211 of the endoscope 200 (attachment step S11). The operator inserts the fastening device 100 and the endoscope 200 into the body (insertion step S12).

Figure 10:
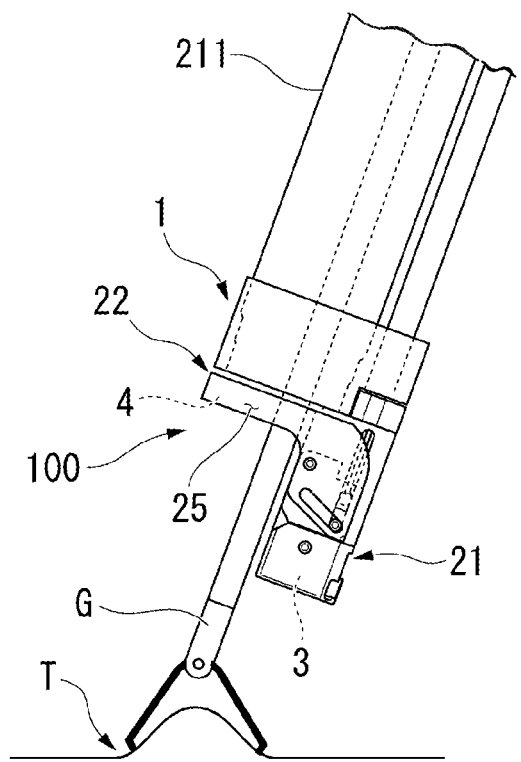
FIG. 10 is a view showing the suturing method of a tissue inside the body according to the same embodiment.

The operator brings the distal-end portion 211 of the endoscope 200 to which the fastening device 100 is attached closer to a treatment target T (an example of the target tissue). The operator transitions the grasping portion 2 to the open state by operating the open-close operation unit 250 to advance the open-close operation wire 5. Since the optical axis of the objective lens 215 passes through the visual space 25, the operator can observe the treatment target T through the imaging unit of the endoscope 200. Since the central axis of the forceps port 214 passes through the visual space 25, as shown in FIG. 10, the operator causes grasping forceps (treatment tool) G to protrude from the forceps port 214 (protrusion step S13), operates the grasping forceps G to bring a distal end of the grasping forceps G closer to the treatment target (advancing step S14), and then grasps the treatment target T (grasping step S15).

The operator retracts the grasping forceps G while grasping the treatment target T with the grasping forceps G. The operator retracts the treatment target T so that the treatment target T is positioned at least in the visual space 25 by retracting the grasping forceps G (retracting step S16). In the present embodiment, the operator may retract in the treatment target T until the treatment target T passes through the visual space 25 by retracting the grasping forceps G until the distal end of the grasping forceps G passes through the visual space 25.

In this state, when the operator moves the wire sheath 280 to the distal end side, the engagement between the cap 1 and the grasping portion 2 is released (rotation restriction release step S17). Therefore, when the operator operates the wire sheath 280 to rotate, the grasping portion 2 can be rotated around the longitudinal axis. Therefore, a direction and posture of the grasping portion 2 can be adjusted to be aligned with a direction in which the operator wants to suture the treatment target T.

Figure 11:
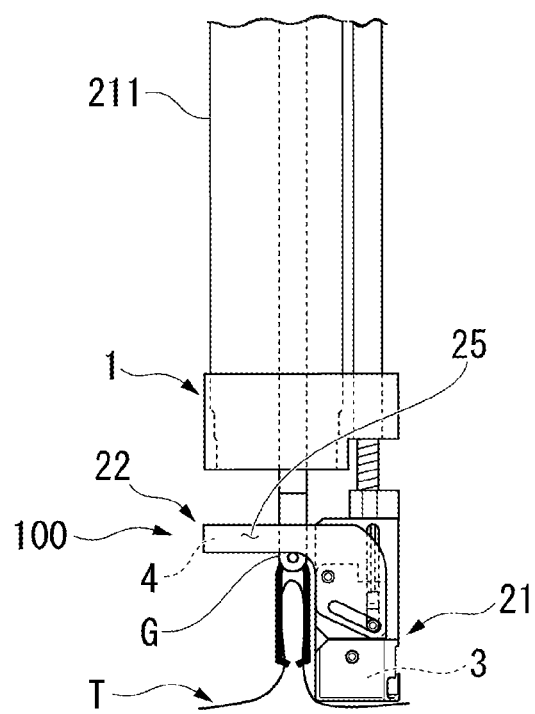
FIG. 11 is a view showing the suturing method of a tissue inside the body according to the same embodiment.

In the retracting step S16, the operator may retract in the treatment target T by advancing the grasping portion 2 with respect to the grasping forceps G. That is, in the retracting step S16, the operator retracts the treatment target T by retracting the grasping forceps G relative to the grasping portion 2. As shown in FIG. 11, since the first grasping member 21 presses down a peripheral part of the treatment target T, the operator easily retracts the treatment target T with the grasping forceps G.

When the grasping portion is retracted while the treatment target T is grasped by the grasping forceps G, a large amount of tissue can be taken into the grasping portion. Also, even in a case of being unable to approach the treatment target T, it is possible to approach the treatment target T by advancing the grasping portion.

When the treatment target T is retracted by advancing the grasping portion 2 with respect to the grasping forceps G, the rotation restriction release step is substantially performed before the retracting step S16. In the present embodiment, the rotation restriction release step S17 may be carried out before the retracting step S16 or after the retracting step S16.

Figure 12:
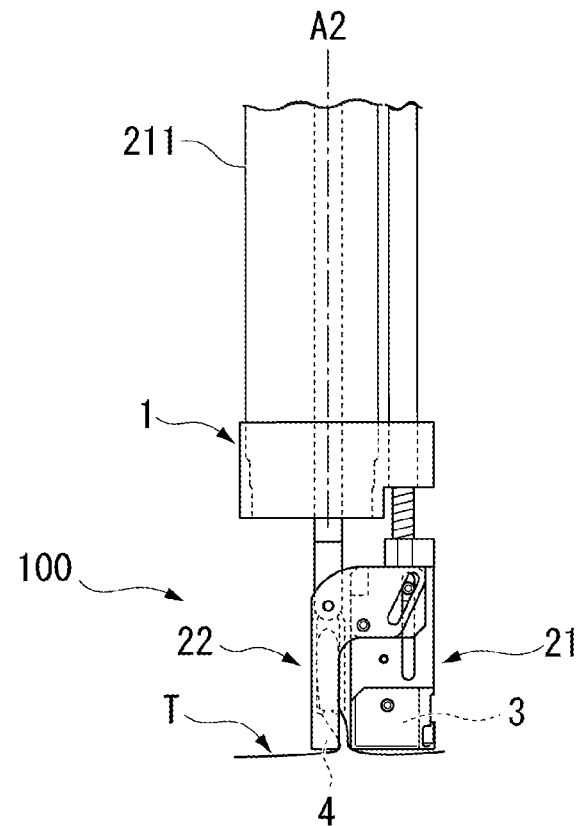
FIG. 12 is a view showing the suturing method of a tissue inside the body according to the same embodiment.

As shown in FIG. 12, the operator transitions the grasping portion 2 to a closed state by operating the open-close operation unit 250 to retract the open-close operation wire 5. The treatment target T is sandwiched between the staple ejection portion 3 of the first grasping member 21 and the staple receiving portion 4 of the second grasping member 22.

When the grasping portion 2 is in the closed state, a part of the treatment target T grasped by the grasping forceps G can be accommodated in a space (the visual space 25)

formed by the U-shaped member 22a of the second grasping member 22 and the second main body portion 22b. Therefore, the treatment target T sandwiched between the staple ejection portion 3 and the staple receiving portion 4 is less likely to lose. In this state, since the restriction on the rotation of the grasping portion 2 around the longitudinal axis is released, the operator can observe the treatment target T from a desired angle by rotating the wire sheath 280.

When the operator operates the ejection operation unit 270 to pull the ejection operation wire 6 with the treatment target T sandwiched between the staple ejection portion 3 and the staple receiving portion 4, the stored staple S is ejected toward the staple receiving portion 4. A needle tip S1 of the staple S penetrates through the treatment target T and is bent by coming into contact with a pocket 41 (see FIG. 5) of the staple receiving portion 4. As a result, as shown in FIG. 12, the treatment target T is sutured (suture step S18).

Figure 13:
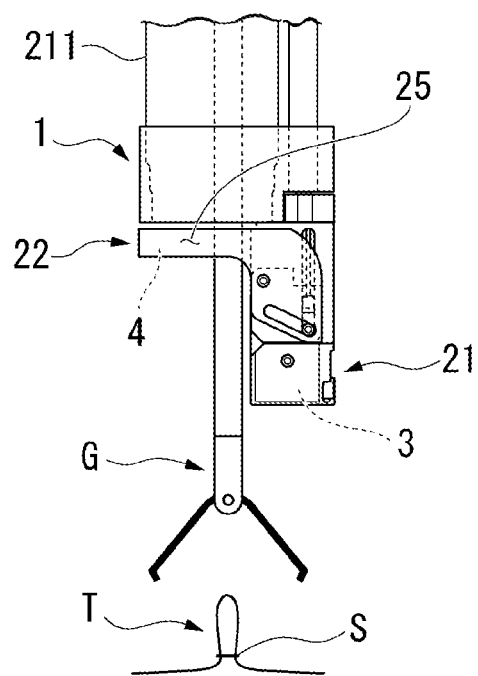
FIG. 13 is a view showing the suturing method of a tissue inside the body according to the same embodiment.
Figure 14:
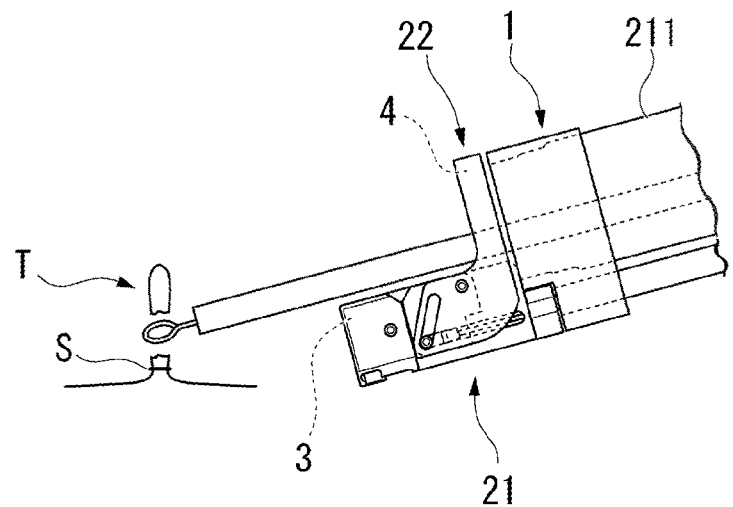
FIG. 14 is a view showing the suturing method of a tissue inside the body according to the same embodiment.

As shown in FIG. 13, the operator operates the open-close operation unit 250 to bring the grasping portion 2 into the open state again. The operator separates the grasping forceps G from the treatment target T and completes the suturing treatment. As shown in FIG. 14, the operator may remove the grasping forceps G through the forceps port 214, and then cause the treatment tool such as a snare wire or a high-frequency knife to protrude from the forceps port 214 to excise the sutured treatment target T.

Thereafter, the operator rotates the wire sheath 280 to align the proximal-end portion 21b of the first grasping member 21 with the recessed portion 1a of the cap 1, and then retracts the wire sheath 280 toward the proximal end side. In this state, when the operator retracts the wire sheath 280 to the proximal end side, the grasping portion 2 and the cap 1 are engaged with each other with the proximal-end portion 21b of the first grasping member 21 accommodated in the recessed portion 1a of the cap 1. Therefore, the rotation of the grasping portion 2 around the longitudinal axis is restricted (rotation restriction step S19).

The fastening device 100 and the endoscope 200, whose rotation is restricted by the engagement of the cap 1 and the grasping portion 2, are removed from the inside of the body (removal step S20). Thereafter, the operator ends the suturing method for the treatment target T through necessary steps (end S21).

A suturing method for the treatment target T according to the present embodiment has been described using the flowchart shown in FIG. 9, but a suturing method is not limited thereto. As described above, the rotation restriction release step S17 may be carried out before the retracting step S16 or after the retracting step S16. The operator can adjust each step as appropriate by taking into consideration an actual treatment situation.

Modified Example

Hereinafter, a configuration of a fastening device 100A according to a modified example of the present embodiment will be described using FIGS. 15 to 19. For the fastening device 100A according to the present modified example, components common to those in the fastening device 100 according to the first embodiment described above will be denoted by the same reference signs, and description thereof will be omitted. Only different points between the fastening device 100A according to the present modified example and the fastening device 100 according to the first embodiment will be described.

Figure 15:
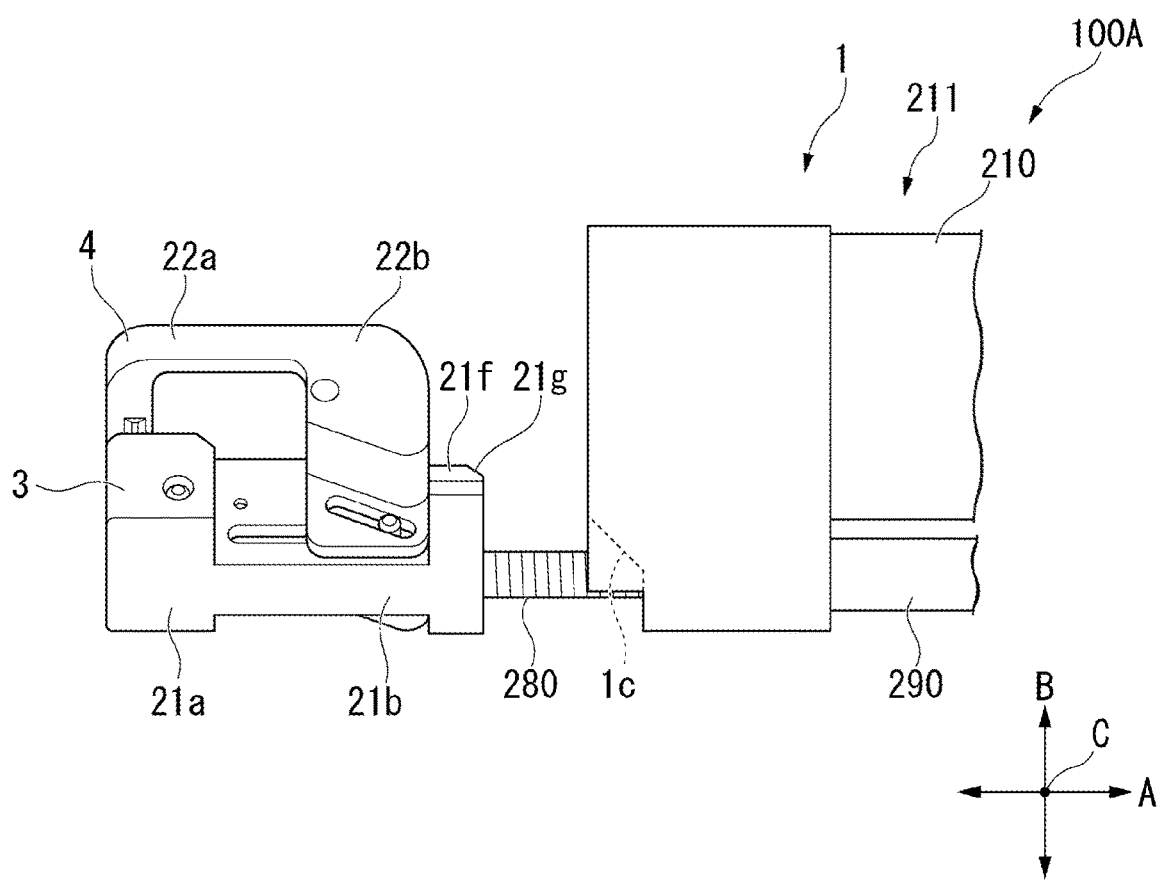
FIG. 15 is a view showing a configuration of a fastening device according to a modified example of the first embodiment of the present disclosure.
Figure 16:
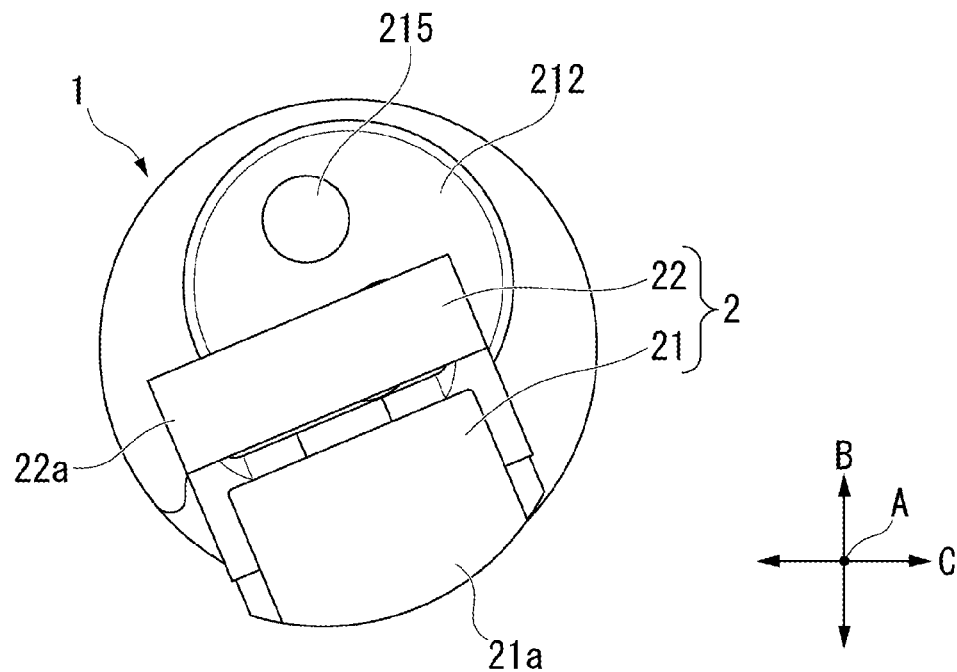
FIG. 16 is a front view showing a configuration of a rotation restriction mechanism of the fastening device.
Figure 17:
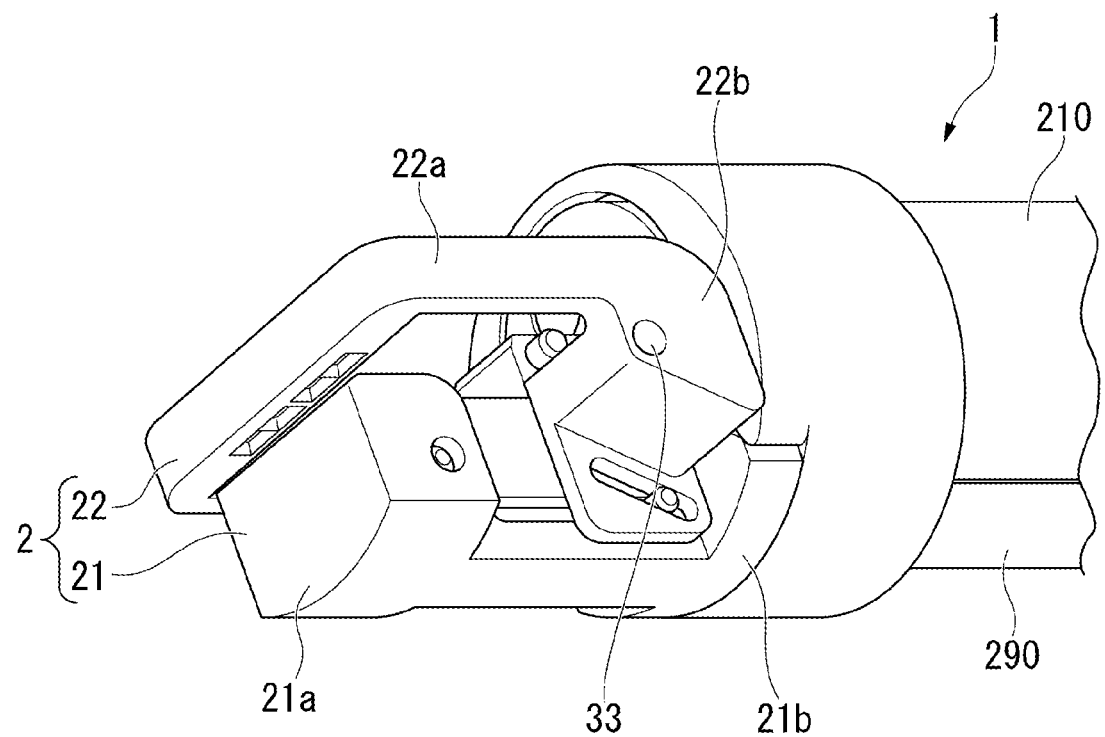
FIG. 17 is a view showing an operation of performing a rotation restriction on the fastening device.
Figure 18:
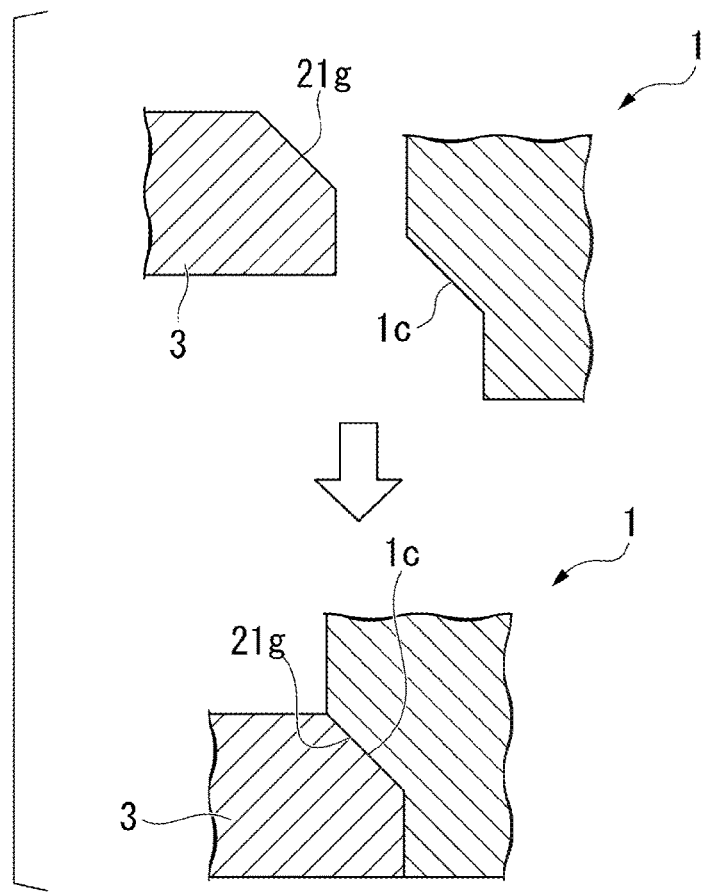
FIG. 18 is a view showing an operation of performing the rotation restriction on the fastening device.
Figure 19:
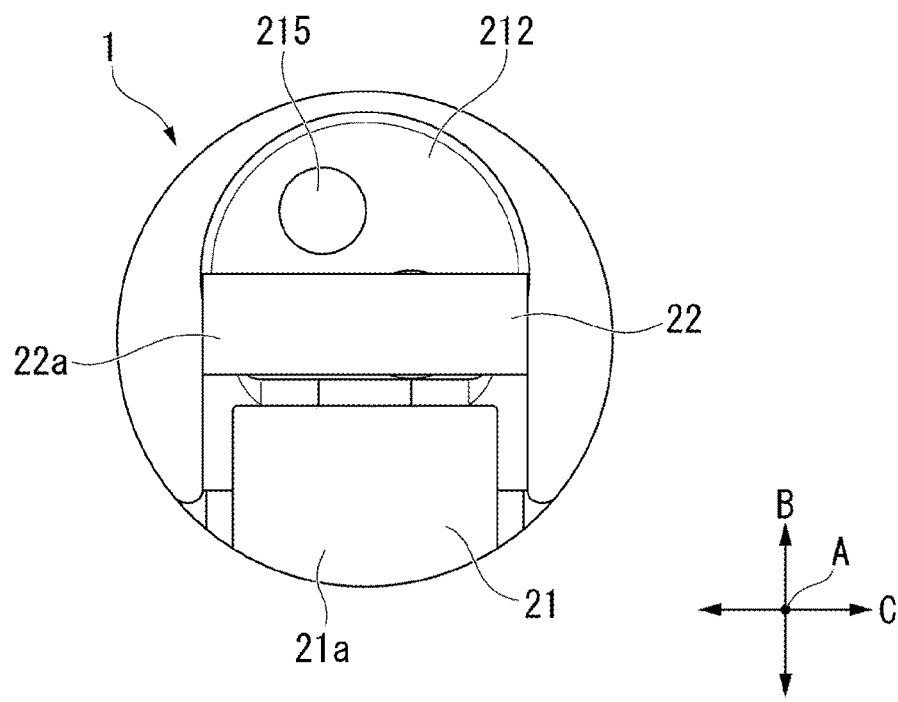
FIG. 19 is a view showing an operation of performing the rotation restriction on the fastening device.

FIG. 15 is a view showing a configuration of the fastening device 100A according to the present modified example. FIG. 16 is a front view for explaining an operation using the fastening device 100A according to the present modified example. FIG. 17 is a view for explaining an operation using the fastening device 100A according to the present modified example. FIG. 18 is an enlarged cross-sectional view of a partial configuration of the fastening device 100A according to the present modified example. FIG. 19 is a view for explaining an operation using the fastening device 100A according to the present modified example.

As shown in FIG. 15, in the fastening device 100A according to the present modified example, an inclined surface inclined with respect to a longitudinal axis of the wire sheath 280 is formed in each of the proximal-end portion 21b of the first grasping member 21 and the recessed portion 1a of the cap 1. The proximal-end portion 21b of the first grasping member 21 includes an inclined surface 21g formed to be inclined with respect to the longitudinal axis of the wire sheath 280. The recessed portion 1a of the cap 1 includes an inclined surface 1c corresponding to the inclined surface 21g and formed to be inclined with respect to the longitudinal axis of the wire sheath 280. Other configurations of the fastening device 100A according to the present modified example are the same as the configurations of the fastening device 100 according to the first embodiment described above.

The inclined surface 21g and the inclined surface 1c may be inclined at substantially the same angle with respect to the longitudinal axis of the wire sheath 280. When the operator retracts the wire sheath 280 to the proximal end side from the state shown in FIG. 9, that is, from a state in which the engagement between the grasping portion 2 and the cap 1 is released, the distal-end portion 21b of the first grasping member 21 is similarly pulled to the distal end side. Due to this operation, the proximal-end portion 21b of the first grasping member 21 engages with the recessed portion 1a of the cap 1 with the inclined surface 21g and the inclined surface 1c in contact with each other.

When the operator engages the grasping portion 2 and the cap 1 again after performing a treatment on the tissue using the fastening device 100 according to the first embodiment described above, it is necessary to operate the wire sheath 280 to adjust a posture of the grasping portion 2 so that the inclined surface 21f formed on the proximal-end portion 21b of the grasping portion 2 and the inclined surface 1b formed in the recessed portion 1a of the cap 1 face each other. As shown in FIG. 10, when a relative positional relationship in a circumferential direction between the grasping portion 2 and the cap 1 deviates, it is necessary for the operator to adjust a position of the grasping portion 2 while observing the state and posture of the grasping portion 2 to engage it with the cap 1.

On the other hand, according to the fastening device 100A according to the present modified example, also in the state shown in FIG. 16, when the operator simply operates to retract the wire sheath 280, the inclined surface 21g formed on the proximal-end portion 21b of the grasping portion 2 comes into contact with the inclined surface 1c formed on the distal end side of the recessed portion 1a of the cap 1 as shown in FIG. 18, and thereby the distal-end portion 21b of the first grasping member 21 slides into the recessed portion 1a to be accommodated therein. As a result, as shown in FIGS. 17 and 19, the grasping portion 2 and the cap 1 are engaged. According to the fastening device 100A according to the present modified example, the operator does not need to observe a state and posture of the grasping portion 2 in an operation of engaging the grasping portion 2 and the cap 1.

The fastening device 100A according to the present modified example has the same effects as those of the fastening device 100 according to the first embodiment because the other configurations are the same. An endoscope system having the fastening device 100A according to the present modified example has the same effects as those of the endoscope system 300 according to the first embodiment.

Second Embodiment

Figure 21:
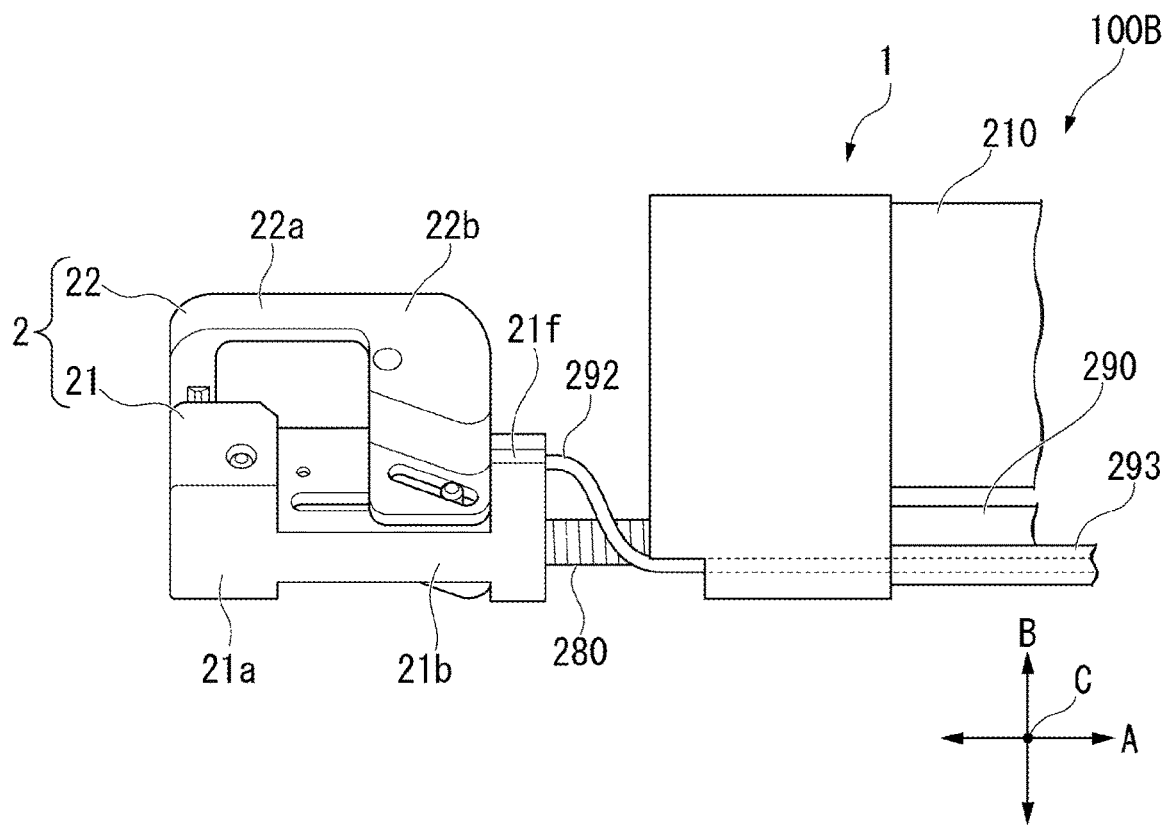
FIG. 21 is a view showing an operation of releasing a rotation restriction on the fastening device.
Figure 22:
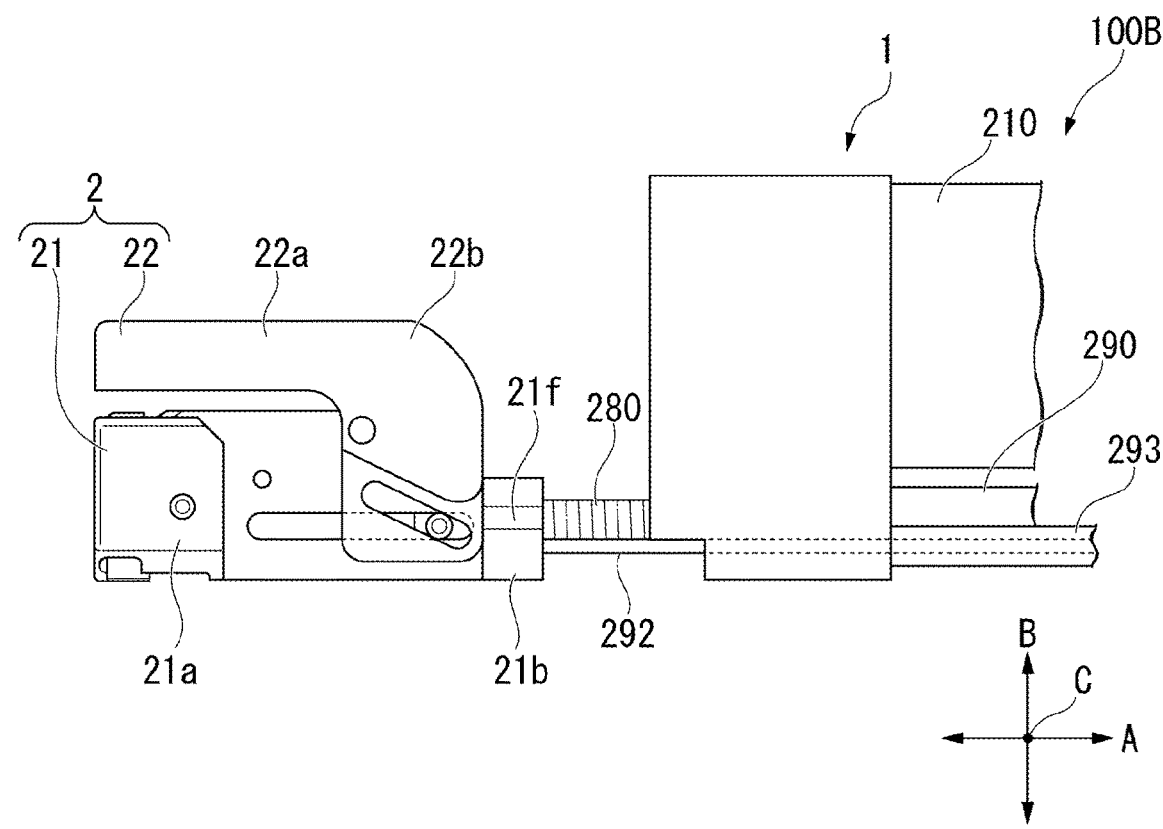
FIG. 22 is a view showing an operation of performing the rotation restriction on the fastening device.

Hereinafter, a configuration of a fastening device 100B according to a second embodiment of the present disclosure will be described using FIGS. 20 to 22. For the fastening device 100B according to the present embodiment, components common to those in the fastening device 100 according to the first embodiment described above will be denoted by the same reference signs, and description thereof will be omitted. Only different points between the fastening device 100B according to the present embodiment and the fastening device 100 according to the first embodiment will be described.

Figure 20:
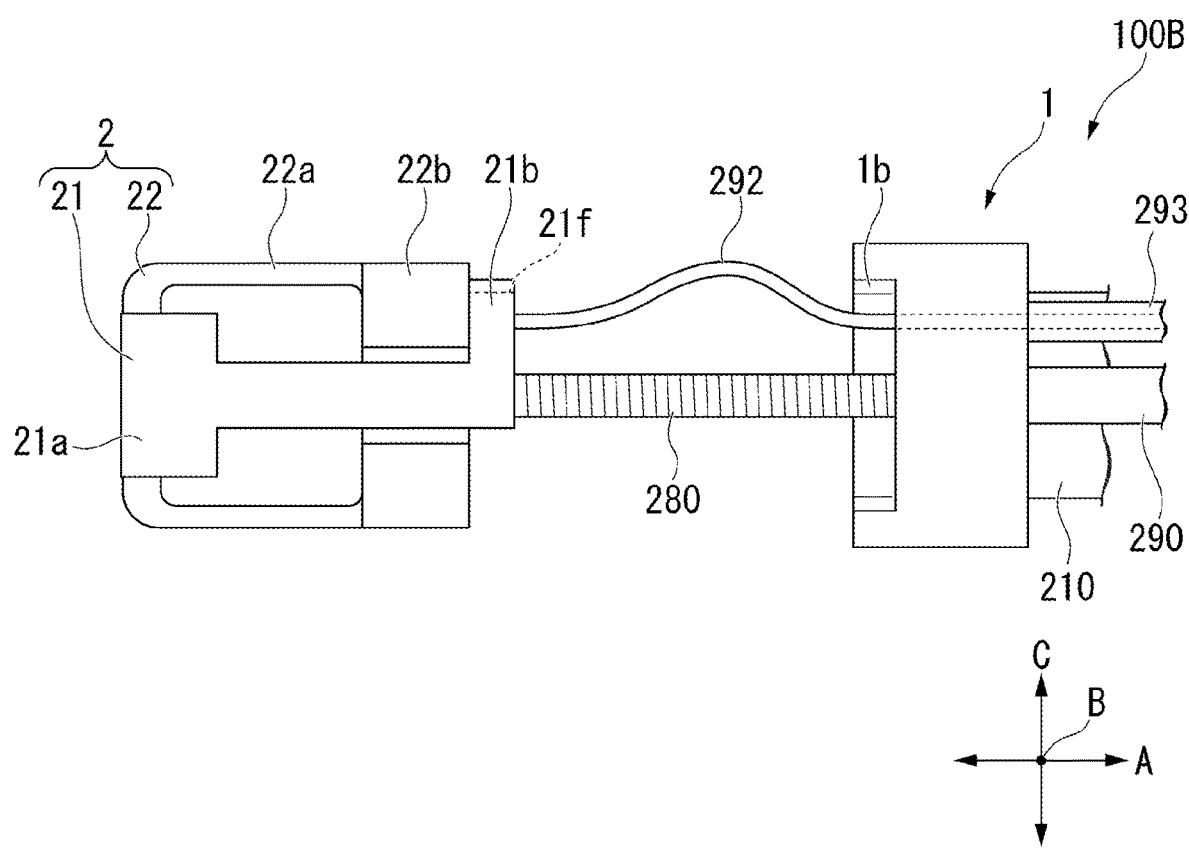
FIG. 20 is a bottom view showing a configuration of a fastening device according to a second embodiment of the present disclosure.

FIG. 20 is a bottom view of the fastening device 100B according to the present embodiment. FIGS. 21 and 22 are views showing an operation using the fastening device 100B according to the present embodiment. The fastening device 100B according to the present embodiment differs from the fastening device 100 according to the first embodiment described above in that one rotation adjustment wire 292 is coupled to a proximal-end portion 21b of a first grasping member 21.

As shown in FIG. 20, the rotation adjustment wire 292 having flexibility is coupled to the proximal-end portion 21b of the first grasping member 21. The rotation adjustment wire 292 may be coupled to the proximal-end portion 21b of the first grasping member 21 by various known methods such as, for example, welding and adhesion. Although not shown, the rotation adjustment wire 292 is formed to be inserted through a resin sheath 293 disposed parallel to a resin sheath 290 and extend to a wire sheath fixing portion 260 on a proximal end side. In the present embodiment, although not shown, the resin sheath 293 may be attached to a rubber stopper 266 on the proximal end side. The rotation adjustment wire 292 may be configured to be operated by the wire sheath fixing portion 260, or an operation unit for adjusting only the rotation adjustment wire 292 may be configured.

As shown in FIG. 20, in a state in which the grasping portion 2 protrudes further to a distal end side than the cap 1, the rotation adjustment wire 292 is coupled to the proximal-end portion 21b of the first grasping member 21 of the grasping portion 2 in a loosened state. In this state, since an engagement between the grasping portion 2 and the cap 1 is released, when an operator operates the wire sheath 280 to rotate, the grasping portion 2 can be rotated around a longitudinal axis of the wire sheath 280. That is, in the fastening device 100B according to the present embodiment, when the grasping portion 2 is moved to the distal end side with respect to the cap 1, and the operator operates the rotation adjustment wire 292 to enter a loosened state, a restriction on rotation of the grasping portion 2 around a longitudinal axis direction is released.

At this time, the operator can perform a treatment on a tissue using the grasping portion 2. When the operator removes the fastening device 100B from the inside of the body after performing a treatment on the tissue, the grasping portion 2 and the cap 1 are engaged again. For example, as shown in FIG. 21, if a relative positional relationship between the grasping portion 2 and the cap 1 in a circumferential direction deviates, when the operator pulls the position adjustment wire 292 to the proximal end side, a tension force (traction force) acting on the position adjustment wire 292 is transmitted to the grasping portion 2. The tension force with which the operator pulls the position adjustment wire 292 to the distal end side causes the position adjustment wire 292 to transition from a loosened state to a substantially straight state as shown in FIG. 16. At the same time, the tension force acting on the position adjustment wire 292 acts on the grasping portion 2, and a moment rotating the grasping portion 2 around the longitudinal axis direction is generated. As a result, as shown in FIG. 22, relative positions of the proximal-end portion 21b of the grasping portion 2 and the recessed portion 1a formed in the cap 1 in the circumferential direction coincide with each other. In this state, when the operator retracts the wire sheath 280 to the proximal end side, the proximal-end portion 21b of the grasping portion 2 is accommodated in the recessed portion 1a formed in the cap 1 to engage the grasping portion 2 and the cap 1.

According to the fastening device 100B according to the present embodiment, the traction force to the proximal end side acting on the position adjustment wire 292 acts as a rotational moment on the grasping portion 2 on the distal end side, causing the grasping portion 2 to rotate around the longitudinal axis. Therefore, in an operation in which the operator engages the grasping portion 2 and the cap 1, the operation of aligning relative positions of the proximal-end portion 21b of the grasping portion 2 and the recessed portion 1a of the cap 1 becomes simpler.

The fastening device 100B according to the present embodiment has the same effects as those of the fastening device 100 according to the first embodiment because the other configurations are the same. An endoscope system having the fastening device 100B according to the present embodiment has the same effects as those of the endoscope system 300 according to the first embodiment.

Modified Example 1

Hereinafter, a configuration of a fastening device 100C according to modified example 1 of the present embodiment will be described using FIGS. 23 to 25. For the fastening device 100C according to the present modified example, components common to those in the fastening device 100B according to the second embodiment described above will be denoted by the same reference signs, and description thereof will be omitted. Only different points between the fastening device 100B according to the present modified example and the fastening device 100B according to the second embodiment will be described.

Figure 23:
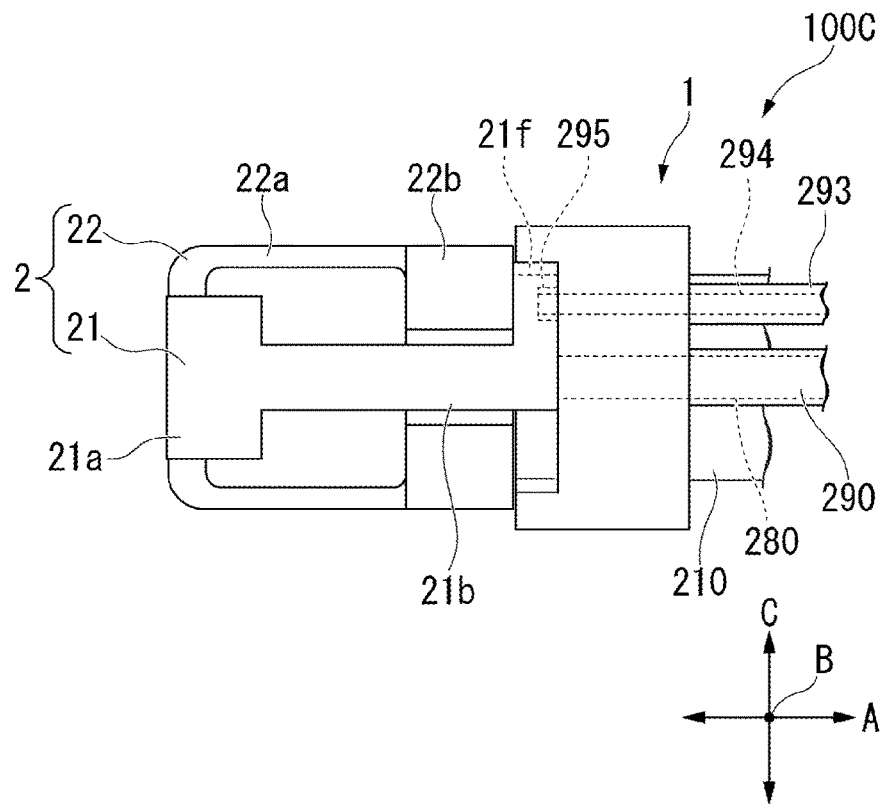
FIG. 23 is a bottom view showing a configuration of a fastening device according to modified example 1 of the second embodiment of the present disclosure.

FIG. 23 is a bottom view showing a state in which the grasping portion 2 and the cap 1 are engaged in the fastening device 100C according to the present modified example. FIG. 24 is a bottom view of the fastening device 100C according to the present modified example showing a state in which an engagement between the grasping portion 2 and the cap 1 is released and the rotation of the grasping portion 2 around the longitudinal axis is restricted when the grasping portion 2 is moved further to the distal end side than the cap 1. FIG. 25 is a bottom view of the fastening device 100C according to the present modified example showing a state in which the engagement between the grasping portion 2 and the cap 1 is released and the restriction on the rotation of the grasping portion 2 around the longitudinal axis is released.

As shown in FIG. 23, the fastening device 100C according to the present modified example differs from the fastening device 100B of the second embodiment described above in that a rotation restriction wire 294 with a higher strength is inserted through the resin sheath 293 instead of the rotation adjustment wire 292. Then, the fastening device 100C according to the present modified example has a port 295, that opens toward the proximal end side and into which the rotation restriction wire 294 can be inserted, in the proximal-end portion 21b of the grasping portion 2.

The rotation restriction wire 294 according to the present modified example preferably has flexibility so that it can smoothly pass through a curved lumen when the fastening device 100C is inserted into the body. On the other hand, the rotation restriction wire 294 preferably has a predetermined rigidity so that it can be moved to the distal end side with respect to the cap 1 and inserted into the port 295 as shown in FIG. 19 to be described later. The rotation restriction wire 294 is formed to be inserted through a through hole formed in the cap 1 and the resin sheath 293 and extend to the wire sheath fixing portion 260 on the proximal end side. In the present modified example, although not shown, the rotation restriction wire 294 may be configured to be operated by the wire sheath fixing portion 260, or an operation unit for adjusting only the rotation restriction wire 294 may be configured.

When the fastening device 100C according to the present modified example is inserted into the body, as shown in FIG. 23, the engagement between the grasping portion 2 and the cap 1 is maintained in a state in which the rotation restriction wire 294 is inserted into the port 295 formed in the proximal-end portion 21b of the grasping portion 2. In this state, the rotation of the grasping portion 2 around the longitudinal axis direction is restricted. The fastening device 100C according to the present modified example is inserted to the position close to the tissue, which is a treatment target, inside the body in a state in which the grasping portion 2 and the cap 1 are engaged and integrated.

Figure 24:
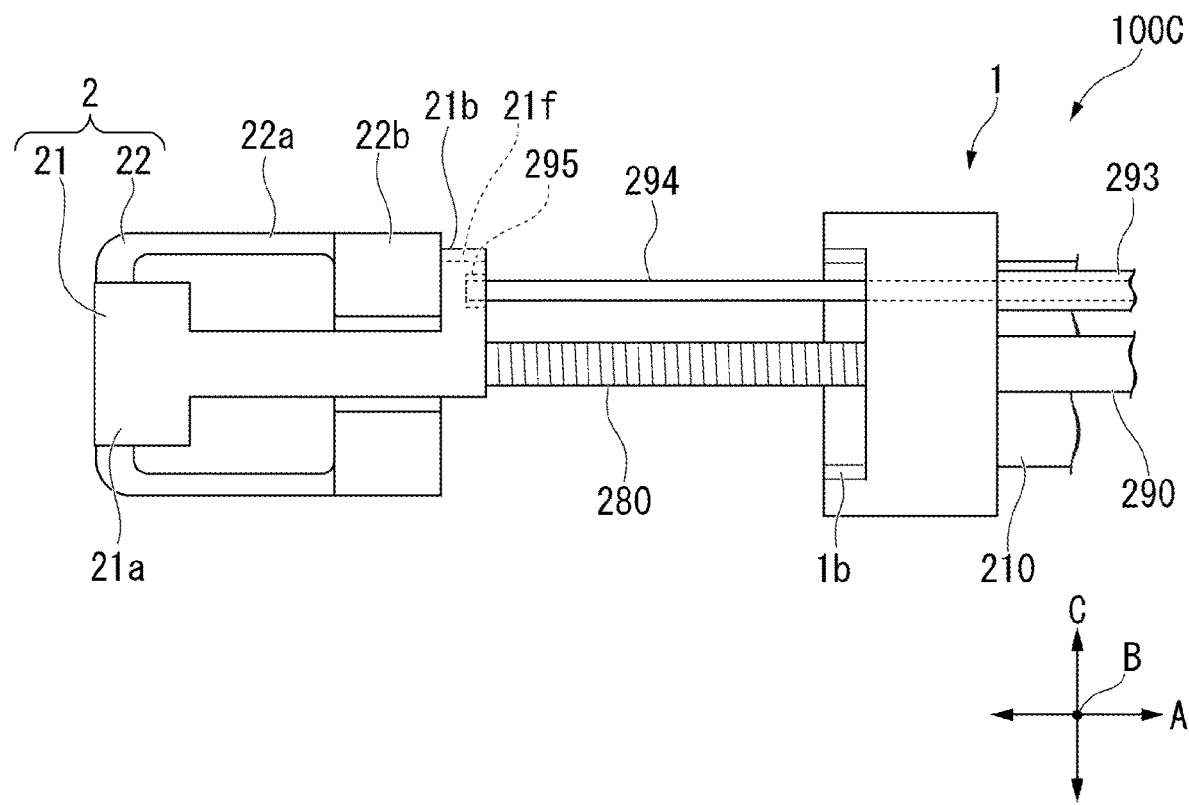
FIG. 24 is a bottom view showing an operation of performing a rotation restriction on the fastening device.

As shown in FIG. 24, in the fastening device 100C according to the present modified example, when the operator pushes the wire sheath 280 to the distal end side while the fastening device 100C is inserted to the position close to the tissue, the grasping portion 2 coupled to the wire sheath 280 moves to the distal end side together. Therefore, the engagement between the grasping portion 2 and the cap 1 is released. However, since the rotation restriction wire 294 is inserted into the port 295 formed in the proximal-end portion 21b of the grasping portion 2, the restriction on the rotation of the grasping portion 2 around the longitudinal axis direction is maintained.

Figure 25:
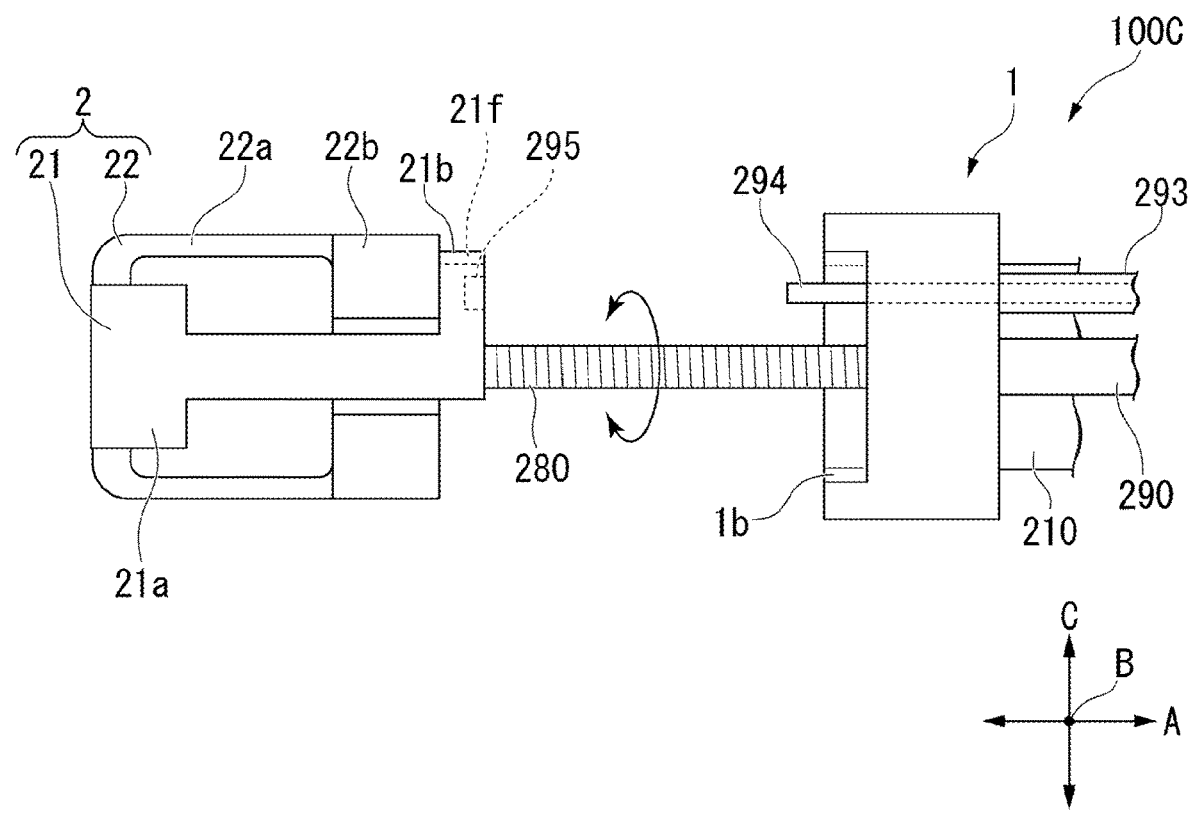
FIG. 25 is a bottom view showing an operation of releasing the rotation restriction on the fastening device.

As shown in FIG. 25, when the operator moves the rotation restriction wire 294 to the proximal end side, the rotation restriction wire 294 is pulled out from the port 295. Therefore, the restriction on the rotation of the grasping portion 2 in the longitudinal axis direction is released. As a result, when the operator operates the wire sheath 280 to rotate, the grasping portion 2 can rotate around the longitudinal axis. Then, similarly to the above-described embodiments and modified examples, the operator can perform a treatment on a tissue inside the body using the fastening device 100C.

Although not shown, when the fastening device 100C is removed out of the body after the treatment on the tissue inside the body is completed using the fastening device 100C, the operator engages the cap 1 and the grasping portion 2 again. When the operator engages the cap 1 and the grasping portion 2, for example, the operator can operate the wire sheath 280 to rotate, align a position of the port 295 formed at the distal-end portion 21b of the grasping portion 2 with a position of the rotation restriction wire 294, and then push the rotation restriction wire 294 toward the port 295. Then, when the operator moves the wire sheath 280 to the proximal end side with the rotation restriction wire 294 inserted into the port 295, that is, with the rotation of the grasping portion 2 around the longitudinal axis restricted, the proximal-end portion 21b of the grasping portion 2 is accommodated in the recessed portion 1a of the cap 1 to engage the grasping portion 2 and the cap 1. The operator can remove the fastening device 100C, in which the grasping portion 2 and the cap 1 are engaged, out of the body.

The fastening device 100C according to the present modified example has the same effects as those of the fastening device 100B according to the present embodiment because the other configurations are the same. An endoscope system having the fastening device 100C according to the present modified example has the same effects as those of the endoscope system according to the present embodiment.

Modified Example 2

Hereinafter, a configuration of a fastening device 100D according to modified example 2 of the present embodiment will be described using FIGS. 26 and 27. For the fastening device 100D according to the present modified example, components common to those in the fastening device 100C according to modified example 1 described above will be denoted by the same reference signs, and description thereof will be omitted. Only different points between the fastening device 100D according to the present modified example and the fastening device 100C according to modified example 1 will be described.

Figure 26:
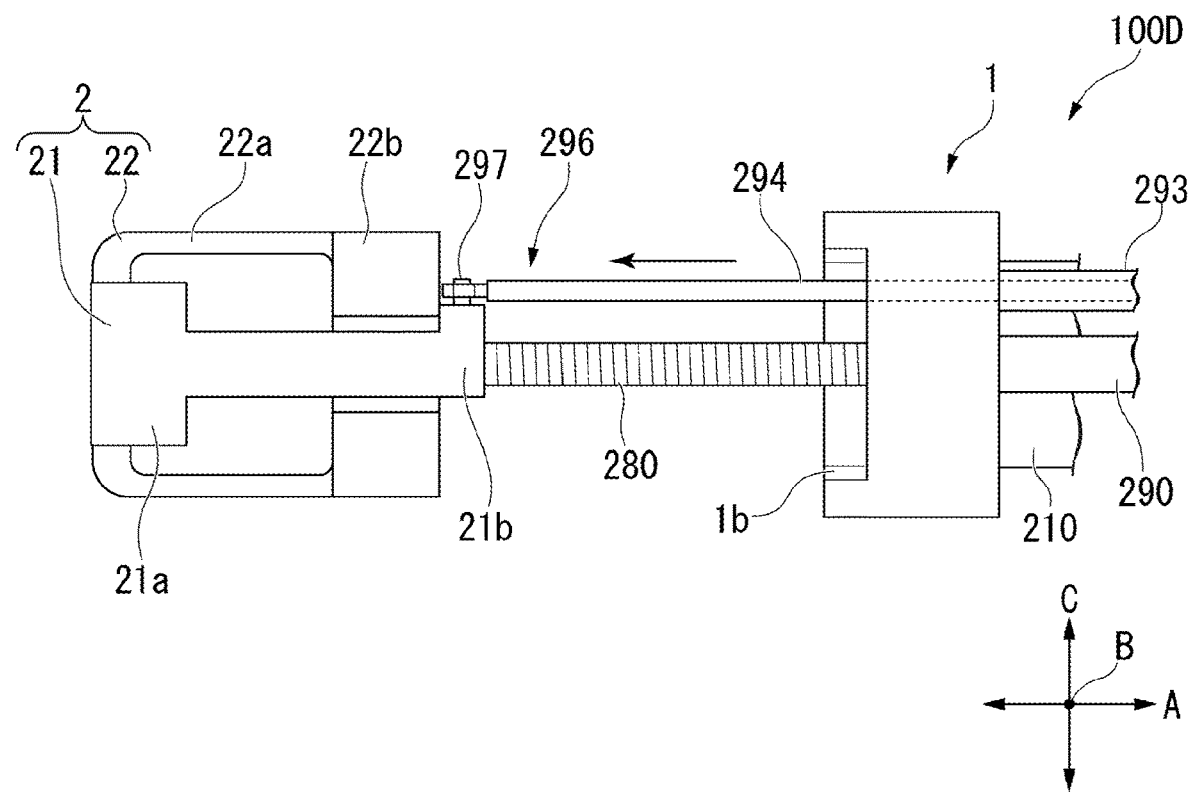
FIG. 26 is a bottom view showing a configuration of a fastening device according to modified example 2 of the second embodiment of the present disclosure.

FIG. 26 is a bottom view of the fastening device 100D according to the present modified example showing a state in which an engagement between the grasping portion 2 and the cap 1 is released, and the rotation of the grasping portion 2 around the longitudinal axis is restricted by moving the grasping portion 2 further to the distal end side than the cap 1. FIG. 27 is a bottom view of the fastening device 100D according to the present modified example showing a state in which the restriction on the rotation of the grasping portion 2 around the longitudinal axis is released.

The fastening device 100D according to the present modified example differs from modified example 1 described above in a form in which the rotation of the grasping portion 2 around the longitudinal axis is restricted. More specifically, the fastening device 100D according to the present modified example includes a protrusion 297 formed on the proximal-end portion 21b of the grasping portion 2, and forceps (rotation restriction member) 296 that can grasp the protrusion 297.

In the fastening device 100D according to the present modified example, the protrusion 297 protruding in a direction intersecting the longitudinal axis of the wire sheath 280, that is, outward in a radial direction, is formed on the proximal-end portion 21b of the grasping member 2. On the other hand, the forceps 296 are inserted through a through hole formed in the cap 1 and the resin sheath 293, and formed to penetrate through the through hole formed in the cap 1 and the resin sheath 293 and extend to the wire sheath fixing portion 260 on the proximal end side. In the present modified example, although not shown, the forceps 296 may be configured to be operated by the wire sheath fixing portion 260, or an operation unit for operating only the forceps 296 may be configured. The forceps 296 according to the present modified example may be configured by, for example, providing a pair of forceps capable of grasping the protrusion 297 at a distal end of the rotation restriction wire 294 according to modified example 1 of the present embodiment described above. However, the forceps 296 according to the present modified example is not limited to this configuration. For example, a hook that can be caught on the protrusion 297 may be provided at a distal end of a wire having flexibility and a predetermined strength.

The fastening device 100D according to the present modified example is inserted to the position close to the tissue inside the body, which is a treatment target, in a state in which the grasping portion 2 and the cap 1 are engaged and integrated. When the fastening device 100D according to the present modified example is inserted into the body, it becomes a state in which the proximal-end portion 21b of the grasping portion 2 is accommodated in the recessed portion 1a formed in the cap 1, and the forceps 296 grasps the protrusion 297. Therefore, the rotation of the grasping portion 2 around the longitudinal axis is restricted.

When the fastening device 100D according to the present modified example is inserted to the position close to the tissue, as shown in FIG. 26, when the operator pushes the wire sheath 280 to the distal end side, the grasping portion 2 coupled to the wire sheath 280 moves to the distal end side together. Therefore, the engagement between the grasping portion 2 and the cap 1 is released. However, since a state in which the forceps 296 grasps the protrusion 297 is maintained, the restriction on the rotation of the grasping portion 2 around the longitudinal axis direction is maintained.

Figure 27:
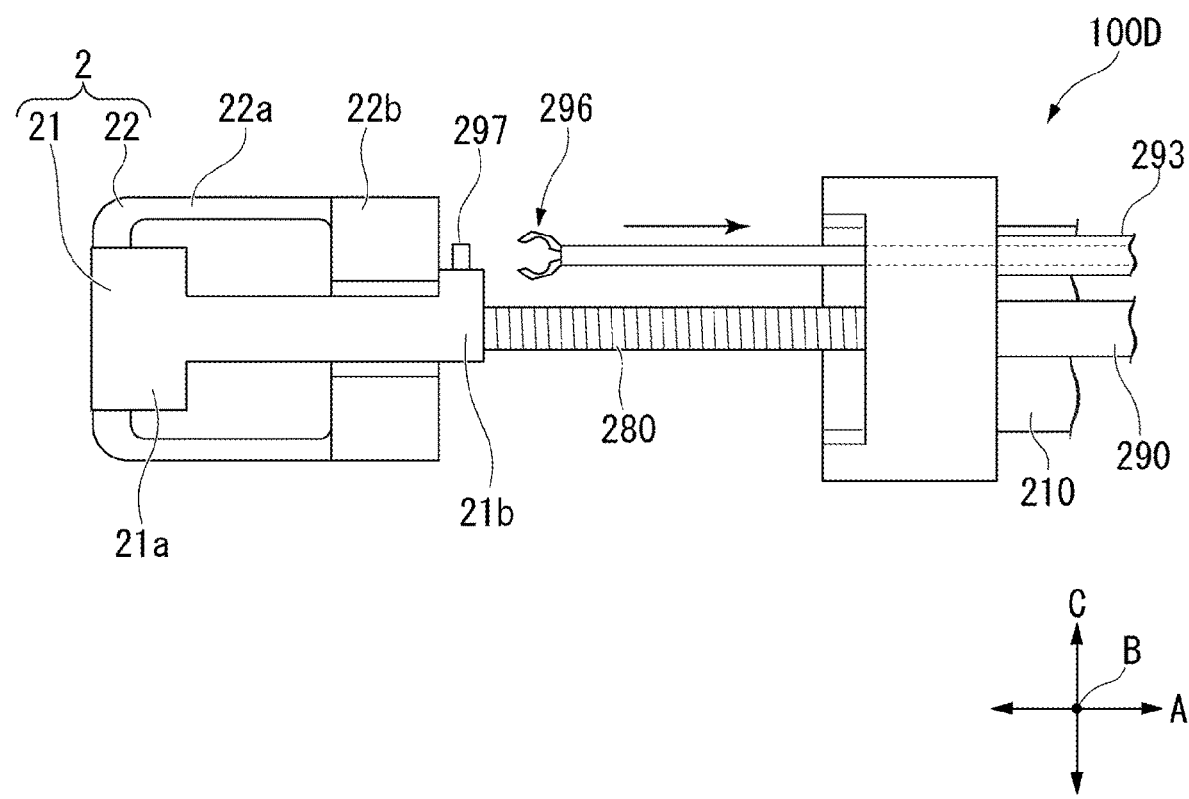
FIG. 27 is a bottom view showing an operation of releasing a rotation restriction on the fastening device.

As shown in FIG. 27, the operator can release the state in which the forceps 296 grasps the protrusion 297 by operating the forceps 296. This operation releases the restriction on the rotation of the grasping portion 2 in the longitudinal axis direction. As a result, when the operator operates the wire sheath 280 to rotate, the grasping portion 2 can rotate around the longitudinal axis. Then, similarly to the above-described embodiments and modified examples, the operator can perform a treatment on a tissue inside the body using the fastening device 100D.

When the fastening device 100D is removed out of the body after the treatment on the tissue inside the body is completed using the fastening device 100D, the operator engages the cap 1 and the grasping portion 2 again. When the operator engages the cap 1 and the grasping portion 2 again, for example, the operator can operate the wire sheath 280 to rotate, align a position of the protrusion 297 formed on the distal-end portion 21b of the grasping portion 2 with a position of the forceps 296, and then move the forceps 296 toward the distal-end portion 21b of the grasping portion 2 to grasp the protrusion 297. Then, when the operator moves the wire sheath 280 to the proximal end side with the forceps 296 grasping the protrusion 297, that is, with the rotation of the grasping portion 2 around the longitudinal axis restricted, the proximal-end portion 21b of the grasping portion 2 is accommodated in the recessed portion 1a of the cap 1 to engage the grasping portion 2 and the cap 1. The operator can remove the fastening device 100D, in which the grasping portion 2 and the cap 1 are engaged, out of the body.

The fastening device 100D according to the present modified example has the same effects as those of the fastening device 100B according to the present embodiment because the other configurations are the same. An endoscope system having the fastening device 100D according to the present modified example has the same effects as those of the endoscope system according to the present embodiment.

While the embodiments of the present disclosure and modified examples corresponding to the embodiments have been described in detail as above with reference to the drawings, the specific configurations are not limited to the embodiments and may include design changes or the like within a range not departing from the gist of the present invention. Also, the components shown in the above-described embodiments and modified examples can be configured by appropriately combining them.

For example, the configuration of the fastening device 100B according to the modified example of the first embodiment of the present disclosure can be applied to the second embodiment and the modified examples. More specifically, an inclined surface inclined with respect to the longitudinal axis of the wire sheath 280 may be formed in each of the proximal-end portion 21b of the first grasping member 21 and the recessed portion 1a of the cap 1 of the fastening devices 100B, 100C, and 100D according to the second embodiment and the modified examples of the present disclosure. Therefore, in the operation of engaging the cap 1 and the grasping portion 2, there is no need for the operator to operate the wire sheath 280 to rotate to align positions of the cap 1 and the grasping portion 2 in the circumferential direction. As a result, an operation by the operator becomes easier.

A suturing method for the treatment target T according to the present disclosure has been described using an operation of the fastening device 100 according to the first embodiment as an example, but a suturing method is not limited thereto. For example, it can be applied to the embodiments and the corresponding modified examples of the present disclosure by appropriately changing the step of restricting the rotation of the grasping portion 2 around the longitudinal axis and the step of releasing the restriction on the rotation of the grasping portion 2 around the longitudinal axis also for the fastening devices according to the modified example of the first embodiment, the second embodiment, and the modified examples of the second embodiment of the present disclosure.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. For example, the configuration according to any one of above-described embodiments and modifications of the present disclosure may be appropriately combined with each modification of the operation section. The present disclosure is not limited by the above description, but only by the appended claims.

What is claimed is:

1. A fastening device comprising:
 a shaft having a longitudinal axis;
 a fixing member configured to fix the shaft to an endoscope by being attached to the endoscope;
 a staple unit attached to a distal end of the shaft and rotatable around the longitudinal axis;
 an operation unit provided at a proximal-end portion of the shaft; and
 a rotation restriction mechanism configured to restrict rotation of the staple unit around the longitudinal axis with respect to the endoscope due to an operation of the operation unit.

2. The fastening device according to claim 1, further comprising an elastic member provided on a proximal end side of the endoscope with respect to the fixing member and in which a through hole penetrating in a direction along the longitudinal axis is formed, wherein
the shaft is inserted through the through hole.

3. The fastening device according to claim 1, wherein the fixing member has:
a first through hole formed to penetrate in a direction along the longitudinal axis and through which the shaft is inserted; and
a second through hole formed to penetrate in the direction along the longitudinal axis and through which the endoscope is inserted.

4. The fastening device according to claim 3, wherein the first through hole is formed at a position eccentric from a central axis of the fixing member.

5. The fastening device according to claim 3, wherein a slit is provided in the first through hole.

6. The fastening device according to claim 3, wherein the rotation restriction mechanism includes:
an engaged portion formed to be recessed from a distal-end surface of the fixing member toward a proximal end side of the endoscope in a region including a position at which the first through hole is formed; and
an engaging portion formed at a proximal-end portion of the staple unit and engageable with the engaged portion.

7. The fastening device according to claim 6, wherein
the staple unit is brought into a state in which rotation thereof around the longitudinal axis is restricted when the engaging portion and the engaged portion are engaged with each other by an operation of the operation unit; and
the staple unit is brought into a state of being rotatable around the longitudinal axis when the engagement between the engaging portion and the engaged portion is released by an operation of the operation unit.

8. The fastening device according to claim 1, wherein the rotation restriction mechanism includes a rotation restriction wire provided to be coupled to a proximal end of the staple unit and extend to a proximal end side of the shaft.

9. The fastening device according to claim 8, wherein the rotation restriction mechanism has a third through hole formed to penetrate in a direction along the longitudinal axis and through which the rotation restriction wire is inserted.

10. The fastening device according to claim 8, wherein
the staple unit is brought into a state in which rotation thereof around the longitudinal axis is restricted when the rotation restriction wire is pulled by an operation of the operation unit and a first tension is generated in the rotation restriction wire, and
the staple unit is brought into a state of being rotatable around the longitudinal axis when pulling of the rotation restriction wire is released by an operation of the operation unit and a second tension smaller than the first tension is generated in the rotation restriction wire.

11. The fastening device according to claim 1, wherein the rotation restriction mechanism includes:
a protrusion provided on the staple unit and protruding in a direction intersecting a direction along the longitudinal axis of the shaft; and
forceps grasping the protrusion.

12. The fastening device according to claim 11, wherein
the staple unit is brought into a state in which rotation thereof around the longitudinal axis is restricted when the forceps grasp the protrusion due to an operation of the operation unit, and
the staple unit is brought into a state of being rotatable around the longitudinal axis when the forceps are separated from the protrusion by an operation of the operation unit.

13. An endoscope system comprising:
an endoscope;
a shaft having a longitudinal axis along the endoscope;
a staple unit attached to a distal end of the shaft and rotatable around the longitudinal axis;
an operation unit provided at a proximal-end portion of the shaft; and
a rotation restriction mechanism configured to restrict rotation of the staple unit around the longitudinal axis with respect to the endoscope due to an operation of the operation unit.

14. A suturing method of a tissue, which is a suturing method of a tissue using a fastening device including a shaft having a longitudinal axis, a fixing member configured to fix the shaft to an endoscope by being attached to the endoscope, a staple unit attached to a distal end of the shaft and rotatable around the longitudinal axis, an operation unit provided at a proximal-end portion of the shaft, and a rotation restriction mechanism configured to restrict rotation of the staple unit around the longitudinal axis with respect to the endoscope due to an operation of the operation unit, the suturing method of a tissue comprising:
a step of inserting the staple unit and the endoscope, which are in a state in which the rotation thereof around the longitudinal axis is restricted, into a body;
a step of grasping at least a part of the tissue with forceps;
a step of pulling a part of the tissue relatively to a proximal end side of the endoscope and positioning a part of the tissue grasped by the forceps within a sutureable range of the fastening device;
a step of releasing a state in which the rotation of the staple unit around the longitudinal axis is restricted; and
a step of ejecting a staple and suturing the tissue using the staple unit.

15. The suturing method of a tissue according to claim 14, wherein
the fastening device further includes a fixing member configured to fix the shaft to the endoscope by being attached to the endoscope, and
the suturing method of a tissue further comprises a step of restricting the rotation of the staple unit around the longitudinal axis by engaging an engaged portion formed to be recessed from a distal-end surface of the fixing member toward the proximal end side of the endoscope and an engaging portion formed in a shape corresponding to the engaged portion at a proximal-end portion of the staple unit.

16. The suturing method of a tissue according to claim 15, further comprising a step of releasing a state in which the rotation of the staple unit around the longitudinal axis is restricted by releasing the engagement between the engaging portion and the engaged portion due to an operation of the operation unit.

17. The suturing method of a tissue according to claim 14, wherein the rotation restriction mechanism includes a rotation restriction wire coupled to a proximal end of the staple unit and extending to the proximal end side of the shaft, and the suturing method of a tissue further comprises a step of pulling the rotation restriction wire to restrict the rotation of the staple unit around the longitudinal axis.

18. The suturing method of a tissue according to claim 14, wherein the rotation restriction mechanism includes a rotation restriction wire coupled to a proximal end of the staple unit and extending to the proximal end side of the shaft, and the suturing method of a tissue further comprises a step of releasing a state in which the rotation of the staple unit around the longitudinal axis is restricted by releasing a tension force pulling the rotation restriction wire to bring the rotation restriction wire into a loosened state.

* * * * *